United States Patent
Keller

(10) Patent No.: US 11,241,116 B2
(45) Date of Patent: Feb. 8, 2022

(54) DIGITAL THERMOMETERS HAVING HEAT VENTS AND INSULATING LAYERS FOR DIRECTING HEAT AWAY FROM ELECTRONIC COMPONENTS

(71) Applicant: Maverick Industries, Inc., Edison, NJ (US)

(72) Inventor: Darren Keller, Easton, PA (US)

(73) Assignee: Maverick Industries, Inc., Edison, NJ (US)

( * ) Notice: Subject to any disclaimer, the term of this patent is extended or adjusted under 35 U.S.C. 154(b) by 291 days.

(21) Appl. No.: 16/713,240

(22) Filed: Dec. 13, 2019

(65) Prior Publication Data

US 2021/0177198 A1  Jun. 17, 2021

(51) Int. Cl.
*G01K 7/00* (2006.01)
*A47J 37/04* (2006.01)
*G01K 7/01* (2006.01)
*G01K 1/14* (2021.01)

(52) U.S. Cl.
CPC ............ *A47J 37/041* (2013.01); *G01K 1/146* (2013.01); *G01K 7/01* (2013.01)

(58) Field of Classification Search
CPC ......... A47J 37/041; G01K 1/146; G01K 7/01; G01K 13/02; G01K 1/14; G01K 5/70
USPC ....................................................... 73/866.5
See application file for complete search history.

(56) References Cited

U.S. PATENT DOCUMENTS

| | | | |
|---|---|---|---|
| 4,133,208 A | 1/1979 | Parlanti | |
| 4,404,813 A | 9/1983 | Paddock et al. | |
| 5,634,719 A | 6/1997 | LaNeve | |
| 5,983,783 A | 11/1999 | Archard et al. | |
| 6,000,845 A | 12/1999 | Tymkewicz et al. | |
| 6,501,384 B2 | 12/2002 | Chapman et al. | |
| 6,539,842 B1 | 4/2003 | Chapman et al. | |
| 6,854,883 B2 | 2/2005 | Rund et al. | |
| 8,240,914 B1 | 8/2012 | Chapman et al. | |
| 9,816,873 B2 * | 11/2017 | Thompson | G01K 13/02 |
| 10,183,806 B1 * | 1/2019 | Zeng | G01K 1/14 |
| 2003/0169803 A1 | 9/2003 | Lee | |

(Continued)

FOREIGN PATENT DOCUMENTS

WO  WO-2004036165 A1 *  4/2004  ............... G01K 5/62

*Primary Examiner* — Gail Kaplan Verbitsky

(74) *Attorney, Agent, or Firm* — Doherty IP Law Group LLC

(57) ABSTRACT

A digital thermometer for cooking includes an outer casing having a bottom wall that defines a closed lower end and a side wall that projects upwardly from the bottom wall to define an open upper end, and a housing for electronic components disposed inside the outer casing and being surrounded by the side wall of the outer casing. A printed circuit board is disposed inside the housing, and a microprocessor and a visual display component are mounted on the printed circuit board. An insulating assembly is disposed inside the outer casing and is located between the bottom wall of the outer casing and the housing containing the electronic components. A temperature sensing probe projects from the bottom wall of the outer casing for obtaining temperature readings and transmitting the temperature readings to the microprocessor. The side wall of the outer casing is spaced from the housing to define a heat vent for dissipating heat.

20 Claims, 23 Drawing Sheets

(56) References Cited

U.S. PATENT DOCUMENTS

| | | |
|---|---|---|
| 2004/0161015 A1* | 8/2004 | Kaiser .................. G01K 5/70 374/187 |
| 2004/0170214 A1 | 9/2004 | Rund |
| 2004/0258129 A1 | 12/2004 | Rund |
| 2007/0067118 A1 | 3/2007 | Cooper |
| 2008/0043809 A1 | 2/2008 | Herbert |
| 2008/0075143 A1 | 3/2008 | Lampke-Honeyghan et al. |
| 2008/0216664 A1 | 9/2008 | Koon et al. |
| 2010/0128753 A1 | 5/2010 | Claypool et al. |
| 2017/0254706 A1* | 9/2017 | Ganrude .................. G01K 1/08 |
| 2019/0049313 A1* | 2/2019 | Keller .................. G01K 13/00 |

* cited by examiner

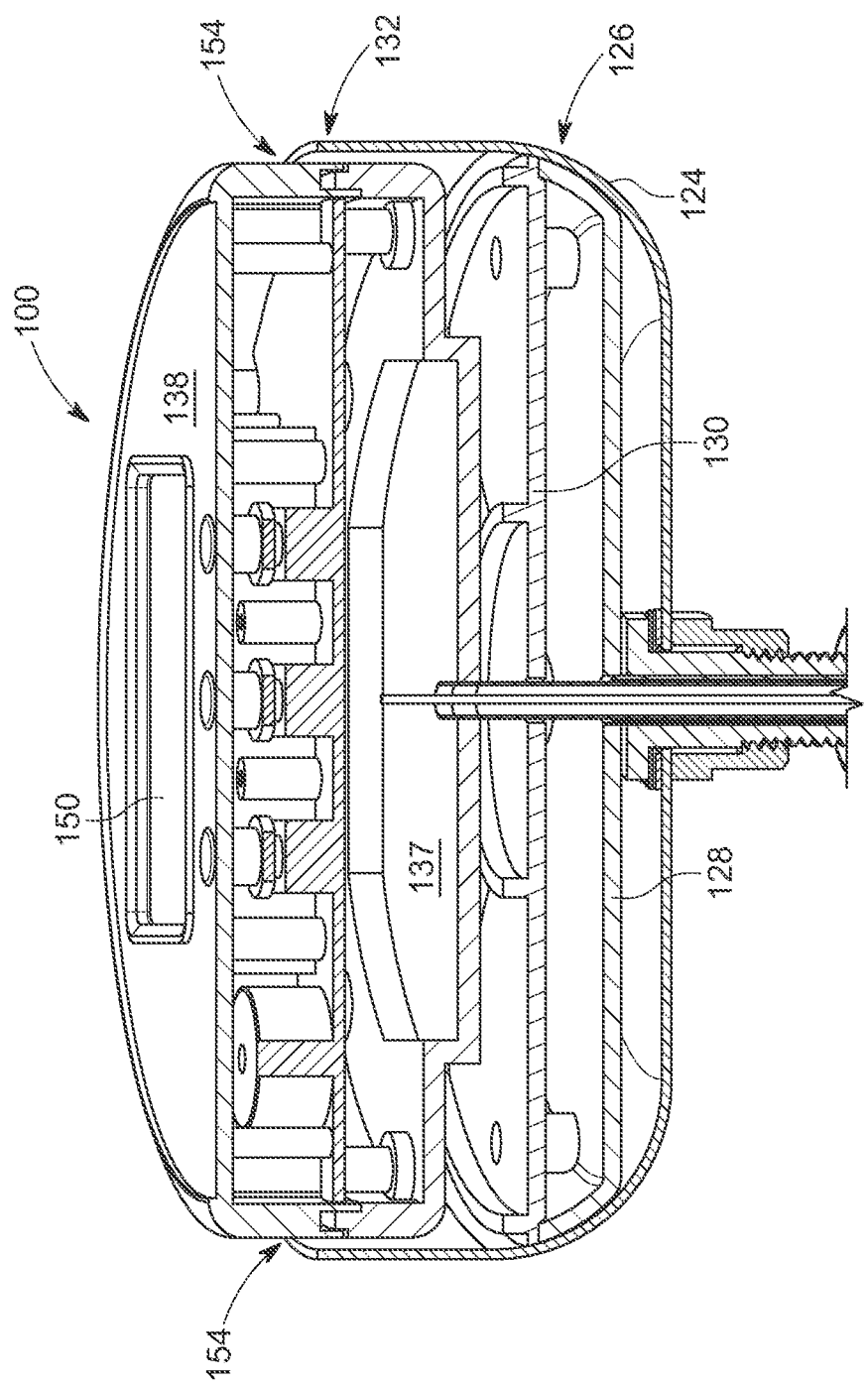

DIGITAL THERMOMETERS HAVING HEAT VENTS AND INSULATING LAYERS FOR DIRECTING HEAT AWAY FROM ELECTRONIC COMPONENTS

BACKGROUND OF THE INVENTION

Field of the Invention

The present patent application is generally related to food preparation, and is more specifically related to thermometers used to measure temperatures to confirm that food, such as meat, is adequately cooked.

Description of the Related Art

The accurate and reliable measurement of temperatures is extremely important in the food preparation industry. Cooking to exact temperature ranges is critical in gourmet cooking and to avoid undercooking food items. As a result, a number of systems and devices have been developed to accurately measure the temperature of food items being cooked.

For example, U.S. Pat. No. 6,000,845 to Tymkewicz et al. discloses a temperature sensing and indicating device including a housing and an arm that is retractable and extendable into and out of the housing so that the length of the arm can be varied in a predetermined manner. A probe having a temperature sensor therein is enclosed by the arm so that varying the external length of the arm exposes varying lengths of the probe, whereby the exposed length of the probe is inserted into a medium so that the temperature sensor senses the temperature of the medium and converts the temperature sensed into a signal. Using a microprocessor, the signal is conditioned and converted for controlling a visual display that provides a visual indication of the temperature sensed. The visual indication includes a digital numeric display and an analog display.

U.S. Pat. No. 5,983,783 to Archer, discloses an electronic chef's fork which displays indicia such as food type and degree of doneness for a selected food type and temperature, and which includes control areas by which a user selects a meat type. The electronic chef's fork includes operational circuitry that enables a user to select among an array of food type options and to designate a degree of doneness for the selected food types. A prompt message is provided to indicate the degree of doneness attained for the selected food type when the device is inserted into food.

U.S. Pat. No. 5,634,719 to LaNeve discloses a food-handling device with a retractable boom mounted temperature probe. The tool has a probe mounted on a manually retractable boom, the probe being extendable over various sites of the food being checked. The boom is pivotally attached to the elongated arm of a spatula and, by a scissor-like action, is raised out of and lowered into the food. The tool is provided with a temperature indicator in the form of a digital readout.

U.S. Pat. No. 8,240,914 to Chapman et al., assigned to Maverick Industries, Inc., discloses a wireless remote cooking thermometer system including a first unit that is positioned at a first location adjacent food being cooked. The first unit has a radio frequency transmitter adapted to transmit a temperature signal associated with temperature readings of the food being cooked. The system also includes at least one microprocessor operative to calibrate taste and choice preferences. The system also includes a temperature probe for recording the temperature of the food being cooked. The system has a second unit with a visual indicator and a radio frequency receiver for receiving temperature signals from the transmitter and displaying the temperature data on the visual indicator.

U.S. Pat. No. 6,539,842 to Chapman et al., assigned to Maverick Industries, Inc., discloses a rotisserie system including a rotatable skewer adapted to secure meat. The rotatable skewer includes a temperature sensor for recording a temperature of the meat and a wireless transmitter for wirelessly transmitting the temperature. The system also includes a remote temperature monitor having a wireless receiver for receiving the wirelessly transmitted temperature and a visual display for displaying the temperature. The remote temperature monitor is movable away from the rotatable skewer while remaining in wireless communication with the wireless transmitter to enable an operator to continuously monitor the cooking temperature of the meat. The wireless transmission and reception can be accomplished using infrared light or radio frequency waves.

In spite of the above advances, there remains a need for a digital thermometer for a BBQ grill that is adapted to be secured to a hood of the BBQ grill. There also remains a need for a digital thermometer for a BBQ grill that is able to operate in high temperature environments while obtaining and displaying accurate temperature readings on a visual display in a digital format. There also remains a need for a digital thermometer that vents and deflects heat away from the electronic components incorporated into the thermometer to enhance the performance of the unit.

SUMMARY OF THE INVENTION

In one embodiment, a digital thermometer for use with a cooking grill preferably includes an outer casing having a bottom wall that defines a closed lower end of the outer casing and a side wall that projects upwardly from the bottom wall to define an open upper end of the outer casing, and a housing for electronic components disposed inside the outer casing and being surrounded by the side wall of the outer casing.

In one embodiment, a printed circuit board is disposed inside the housing for electronic components, and a microprocessor and a visual display component may be mounted on the printed circuit board disposed inside the housing. In one embodiment, the electronic components that are mounted on the printed circuit board are mounted on a side of the printed circuit board that is furthest away from the heat (e.g., the top surface of the printed circuit board that faces away from the bottom wall of the outer casing).

In one embodiment, an insulating assembly is disposed inside the outer casing and is located between the bottom wall of the outer casing and the housing for electronic components.

In one embodiment, a temperature sensing probe projects from the bottom wall of the outer casing for obtaining temperature readings and transmitting the temperature readings to the microprocessor mounted on the printed circuit board.

In one embodiment, the side wall of the outer casing is spaced from the housing for electronic components to define a heat vent that extends between the outer casing and the housing for electronic components for dissipating heat from the digital thermometer.

In one embodiment, the outer casing is preferably made of a thermally conductive material such as stainless steel.

In one embodiment, the bottom wall of the outer casing preferably has a central opening extending therethrough, and the temperature sensing probe passes through the central opening of the bottom wall.

In one embodiment, the digital thermometer preferably includes an outer casing screw that is coupled with the outer casing and that projects from the bottom wall of the outer casing. In one embodiment, the outer casing screw has a screw head that overlies a top surface of the bottom wall of the outer casing, an elongated shaft having external threads that projects from the bottom wall of the outer casing, and an elongated conduit that extends along a length of the elongated shaft.

In one embodiment, the temperature sensing probe preferably passes through the elongated conduit of the outer casing screw. In one embodiment, the temperature sensing probe has a lower end that projects below a lower end of the outer casing screw.

In one embodiment, a digital thermometer for cooking desirably includes an internally threaded nut that is threaded onto the external threads of the outer casing screw for securing the outer casing screw to the outer casing. In one embodiment, after the outer casing screw and the internally threaded nut are assembled together, the bottom wall of the outer casing is preferably located between the screw head of the outer casing screw and the internally threaded nut.

In one embodiment, the insulating assembly preferably includes a bottom insulating layer having an outer rim that extends around an outer perimeter thereof, and a top insulating layer assembled with and overlying a top surface of the bottom insulting layer. In one embodiment, a bottom surface of the top insulating layer is spaced away from the top surface of the bottom insulating layer to define a double-walled structure having an insulating air gap between the top and bottom insulating layers.

In one embodiment, the outer rim of the bottom insulating layer desirably includes a convexly curved surface, and an inner surface of the side wall of the outer casing desirably includes a concave surface that seats the convexly curved surface of the outer rim of the bottom insulating layer.

In one embodiment, the insulating assembly may be made of a plastic material that exhibits high resistance to heat, such as Bakelite material.

In one embodiment, the housing for electronic components preferably includes a housing base that is adapted to seat the printed circuit board, and a housing cover overlying the housing base. In one embodiment, the printed circuit board is preferably disposed between the housing cover and the housing base.

In one embodiment, the housing for electronic components preferably has an outer perimeter that defines an outer diameter of the housing for electronic components. In one embodiment, the side wall of the outer casing preferably has an inner surface that defines an inner diameter of the outer casing, whereby the inner diameter of the outer casing is greater than the outer diameter of the housing for electronic components to define a heat vent that extends between the housing for electronic components and the outer casing. The heat vent may have an annular shape.

In one embodiment, the digital thermometer preferably includes a temperature sensor that is disposed inside the temperature sensing probe, which is adapted to obtain temperature data at a lower end of the temperature sensing probe and transmit the temperature data to the microprocessor mounted on the printed circuit board. In one embodiment, the temperature sensor may include one or more thermocouples, one or more thermistors, one or more resistance temperature detectors (RTD), and combinations thereof.

In one embodiment, the temperature sensor preferably has an upper end (e.g., a thermocouple wire) that passes through the bottom wall of the outer casing, the insulating assembly, and the housing for electronic components for being in electronic communication with the microprocessor mounted on the printed circuit board.

In one embodiment, the visual display component may be a liquid crystal display or a light emitting diode display.

In one embodiment, a digital thermometer for cooking desirably includes a bowl-shaped outer casing made of a thermally conductive metal. The bowl-shaped outer casing preferably has a bottom wall that defines a closed lower end of the bowl-shaped outer casing and a side wall that projects upwardly from the bottom wall to define an open upper end of the bowl-shaped outer casing.

In one embodiment, the digital thermometer preferably includes a housing for electronic components that is disposed inside the bowl-shaped outer casing and that is surrounded by the side wall of the bowl-shaped outer casing. In one embodiment, a printed circuit board is disposed inside the housing, and a microprocessor and a visual display component may be mounted on the printed circuit board.

In one embodiment, the digital thermometer may include an insulating assembly disposed inside the bowl-shaped outer casing, which is desirably located between the bottom wall of the bowl-shaped outer casing and the housing, and a temperature sensing probe projecting from the bottom wall of the bowl-shaped outer casing for obtaining temperature readings and transmitting the temperature readings to the microprocessor mounted on the printed circuit board.

In one embodiment, the side wall of the bowl-shaped outer casing is preferably spaced from the housing for defining a heat vent that extends between the outer casing and the housing for dissipating heat from the digital thermometer.

In one embodiment, the insulating assembly desirably deflects heat away from the electronic components mounted on the printed circuit board such as the microprocessor and the visual display component.

In one embodiment, the housing has an outer perimeter that defines an outer diameter of the housing, and the side wall of the outer casing has an inner surface that defines an inner diameter of the outer casing. In one embodiment, the inner diameter of the outer casing is preferably greater than the outer diameter of the housing to define the heat vent that extends between the housing and the outer casing. In one embodiment, the heat vent has a width of about one-three mm and more preferably about one mm.

In one embodiment, a temperature sensor is preferably disposed inside the temperature sensing probe. In one embodiment, the temperature sensor is adapted to obtain temperature data at a lower end of the temperature sensing probe and transmit the temperature data (e.g., via a wire) to the microprocessor mounted on the printed circuit board.

In one embodiment, the temperature sensor has an upper end that passes through the bottom wall of the outer casing, the insulating assembly, and the housing for electronic components for being in electronic communication with the microprocessor mounted on the printed circuit board.

These and other preferred embodiments of the present invention will be described in more detail below.

BRIEF DESCRIPTION OF THE DRAWINGS

FIG. 17B is still another cross-sectional view of the digital thermometer shown in FIG. 17A.

DETAILED DESCRIPTION OF PREFERRED EMBODIMENTS

Figure 1A:
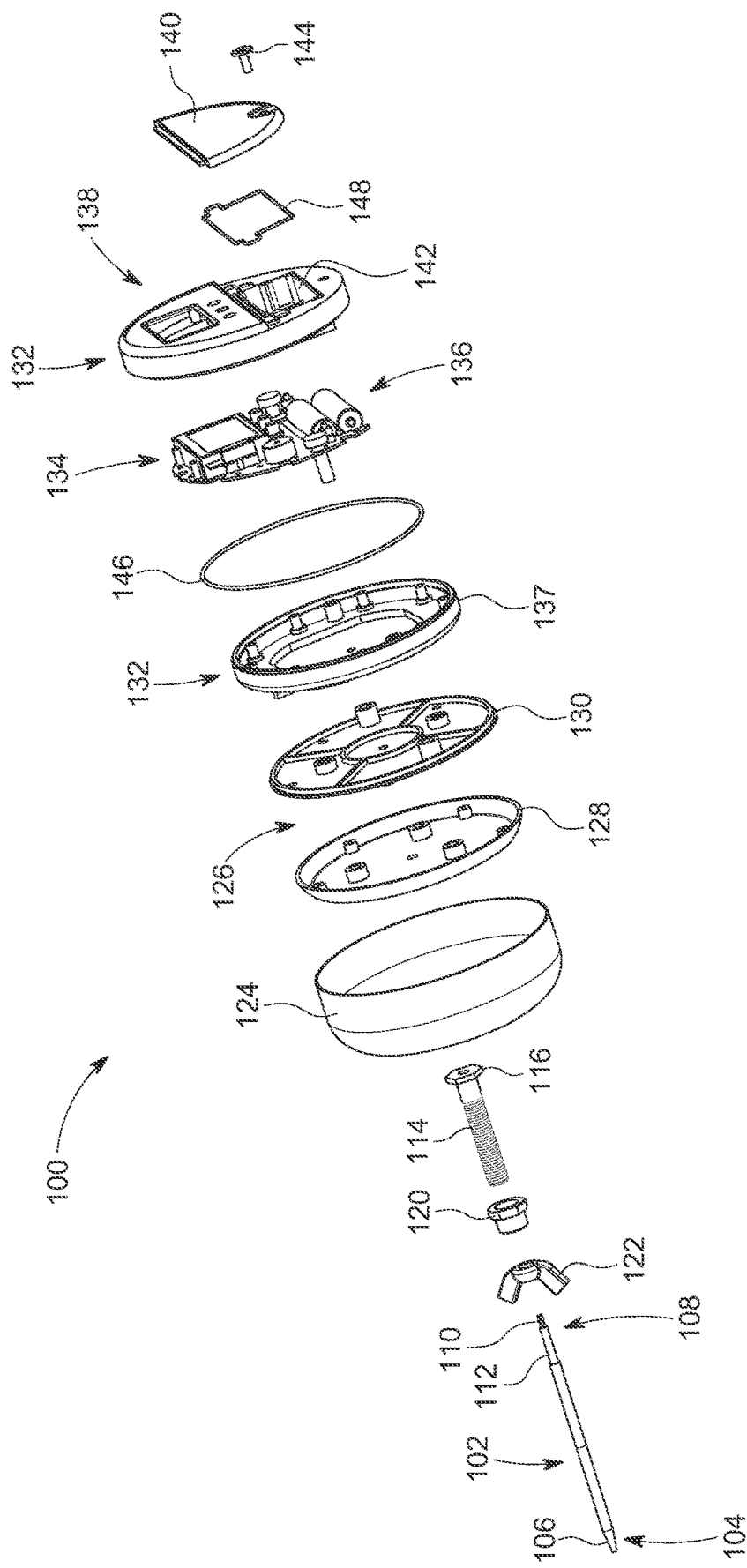
FIG. 1A is an exploded view of a digital thermometer for a cooking grill, in accordance with one embodiment of the present patent application.
Figure 1B:
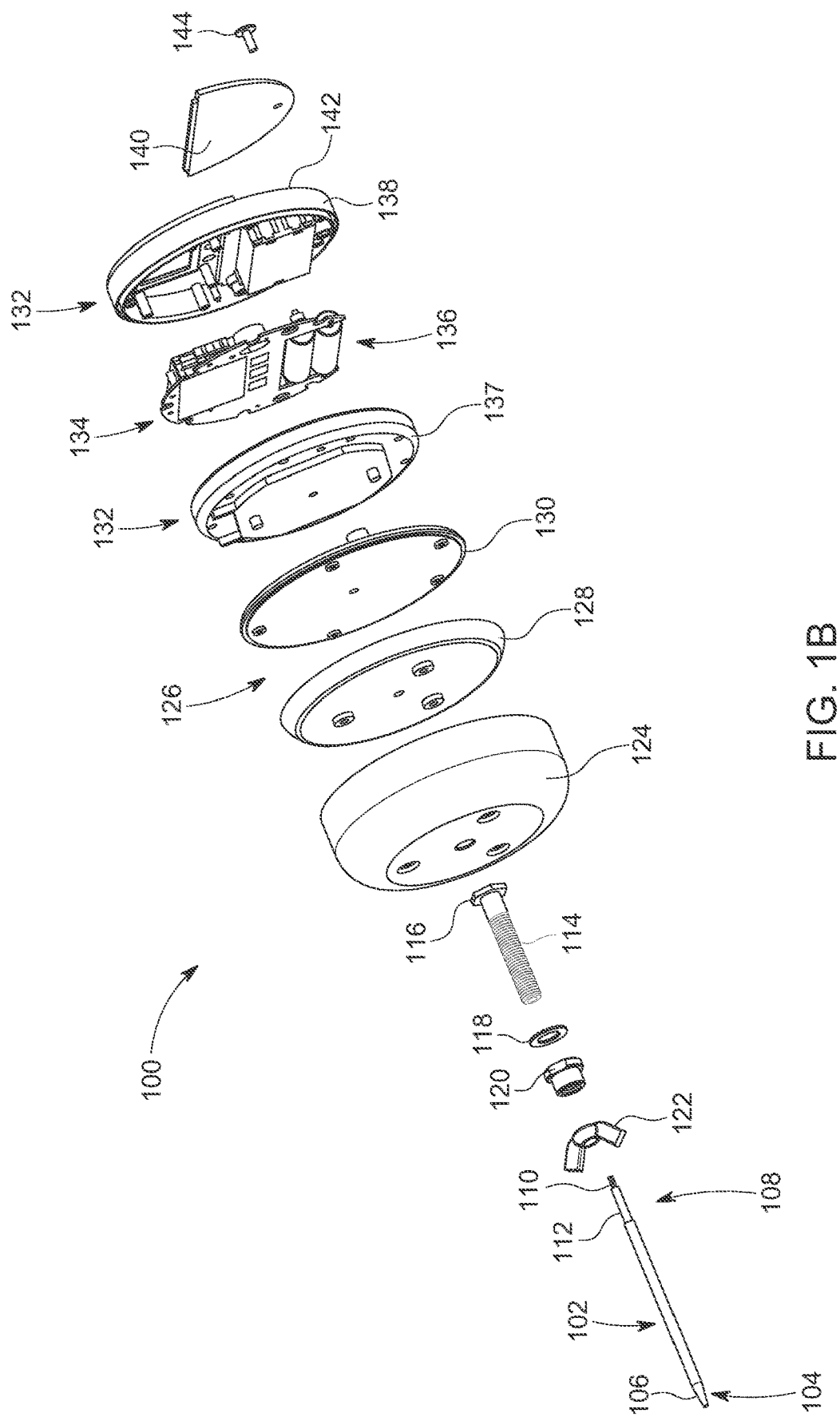
FIG. 1B is another exploded of the digital thermometer shown in FIG. 1A.

Referring to FIGS. 1A and 1B, in one embodiment, a digital thermometer 100 for a cooking grill (e.g., a BBQ grill) preferably includes a temperature sensing probe 102 having a lower end 104 with a pointed tip 106 and an upper end 108 that is spaced away from the lower end 104. In one embodiment, the temperature sensing probe 102 is preferably made of a heat conducting material such as metal, and more preferably stainless steel. In one embodiment, the digital thermometer 100 preferably includes a temperature sensor (e.g., a thermocouple) including a wire 110 that projects from the upper end 108 of the temperature sensing probe 102. In one embodiment, the wire 110 is preferably a k-type thermocouple wire that is adapted to record temperature readings of up to about 900-1,000 degrees Fahrenheit, and more preferably about 900-950 degrees Fahrenheit. In one embodiment, the digital thermometer 100 preferably includes a heat resistant tube 112, such as a fiber pipe, that covers at least a portion of the wire 110 and that extends along the length of the temperature sensing probe 102 for spacing the wire from the elongated body of the temperature sensing probe. In other embodiment, the temperature sensor may include a thermistor or a resistance temperature detector (RTD).

In one embodiment, the digital thermometer 100 preferably includes an outer casing screw 114 having an upper end with a screw head 116. The outer casing screw preferably has an elongated shaft and external threads that extend along an outer surface of the elongated shaft. In one embodiment, the digital thermometer 100 desirably includes an outer casing washer 118 that is adapted for being disposed over the elongated shaft of the outer casing screw 114. In one embodiment, the digital thermometer 100 preferably includes an outer casing nut 120 that is internally threaded for meshing with the external threads of the outer casing screw 114, and a threaded fastener 122 (e.g., a wing nut) having internal threads that are also adapted to mesh with the external threads of the outer casing screw 114.

In one embodiment, the digital thermometer 100 preferably includes an outer casing 124 that is adapted for being assembled with the temperature sensing probe 102, the outer casing screw 114, the outer casing washer 118, and the outer casing nut 120. In one embodiment, the outer casing 124 is preferably made of a heat conductive material such as stainless steel. In one embodiment, the outer casing 124 may have a bowl-like shape with a closed lower end and an open upper end.

In one embodiment, the outer casing 124 is preferably adapted to receive an insulating assembly 126 having a bottom insulating layer 128 and a top insulating layer 130. In one embodiment, the bottom and top insulating layers preferably define a double walled insulating assembly 126 structure that shields the electronic components of the digital thermometer from heat. As will be described in more detail herein, the insulating assembly 126 is adapted to insulate the electronic components of the digital thermometer from heat (e.g., the heat generated by the fire of a BBQ grill) so that the performance of the electronic components may be optimized and not adversely impacted by the heat.

In one embodiment, the bottom insulating layer 128 and the top insulating layer 130 of the insulating assembly 126 are preferably made of a material that is resistant to heat, such as a Bakelite material. In one embodiment, the Bakelite material is preferably a synthetic plastic that has a high resistance to heat. The characteristics of Bakelite made it particularly suitable as a molding compound, an adhesive or binding agent, a varnish, and a protective coating. Bakelite was particularly suitable for use in the electrical and automobile industries because of its extremely high resistance to electricity, heat, and chemical action. See https://en.wikipedia.org/wiki/Bakelite.

In one embodiment, the digital thermometer 100 desirably includes a housing 132 for electronic components that is adapted to receive electronic components such as a printed circuit board 134 having electronics (e.g., microprocessors, controllers, memory chips) incorporated therein for receiving data from the temperature sensing probe 102 and providing a digital read out on a display screen to display the temperatures recorded by the temperature sensing probe. In one embodiment, the housing 132 for electronic components may be made of plastic materials that have a high resistance to heat for protecting the electronic components disposed within the electronics components base.

In one embodiment, the electronic components secured to the printed circuit board 134 may be powered by a power source 136. The power source 136 may include one or more batteries such as alkaline batteries or rechargeable batteries.

In one embodiment, the housing 132 preferably includes a housing base 137 and a housing cover 138 that is adapted to be secured over the housing base 137, with the printed circuit board 134, the electronic components mounted to the printed circuit board, and the power source 136 disposed between the housing cover 138 and the housing base 137. In one embodiment, the housing cover 138 is desirably made of a high temperature plastic that is adapted to withstand a high temperature environment of a cooking grill. In one embodiment, the digital thermometer 100 desirably includes a battery cover 140 that is adapted to cover a battery compartment 142 formed in the housing cover 138 and a battery cover screw 144 that secures the battery cover 140 in place over the battery compartment 142.

Referring to FIG. 1A, in one embodiment, the digital thermometer 100 preferably includes an electronic components O-ring 146, such as a rubber O-ring, that forms an insulating and/or a water-tight seal between a front side of the housing base 137 and a rear face of the housing cover 138. The O-ring 146 preferably prevents heat and/or moisture from entering into a sealed chamber bounded by the housing base 137 and the housing cover 138 for protecting the electronic components mounted on the printed circuit board 134. In one embodiment, the digital thermometer 100 preferably includes a battery compartment O-ring 148, such as a rubber O-ring, that provides a seal around the outer perimeter of the battery compartment 142 to prevent heat and/or moisture from entering into the battery compartment 142, which could adversely impact the performance of the power source 136 or the electronic components of the digital thermometer.

Referring to FIGS. 2A-2E, in one embodiment, the digital thermometer 100 preferably includes the outer casing 124 with the housing cover 138 of the housing 132 (FIG. 1B) assembled with the outer casing 124. In one embodiment, the housing cover 138 preferably has an opening for a temperature display screen 150 that is adapted to display temperatures that are recorded by the temperature sensing probe 102. In one embodiment, the temperatures that are displayed on the temperature display screen 150 are displayed in digital format (e.g., liquid crystal display, light emitting diode display). The digital thermometer 100 desirably includes the battery cover 140 that may be secured to the housing cover 138 by the battery cover screw 144. The battery compartment is preferably located at a top side of the housing cover 138 to allow heat dissipation of any heat present in the battery compartment. In one embodiment, the digital thermometer 100 preferably includes one or more control buttons 152A-152C that may be utilized for controlling the operation of the digital thermometer and/or the types of information that are displayed on the temperature display screen 150.

In one embodiment, the digital thermometer 100 preferably includes a heat vent 154 that extends between the outer diameter or outer perimeter of the housing 132 for electronic components and the inner diameter of the outer casing 124. In one embodiment, the heat vent 154 has an annular shape and may extend completely around the outer perimeter of the housing 132. The heat vent 154 preferably vents the heat that may build up between the outer casing and housing for electronic components to direct the heat away from the electronic components of the digital thermometer.

Figure 2A:
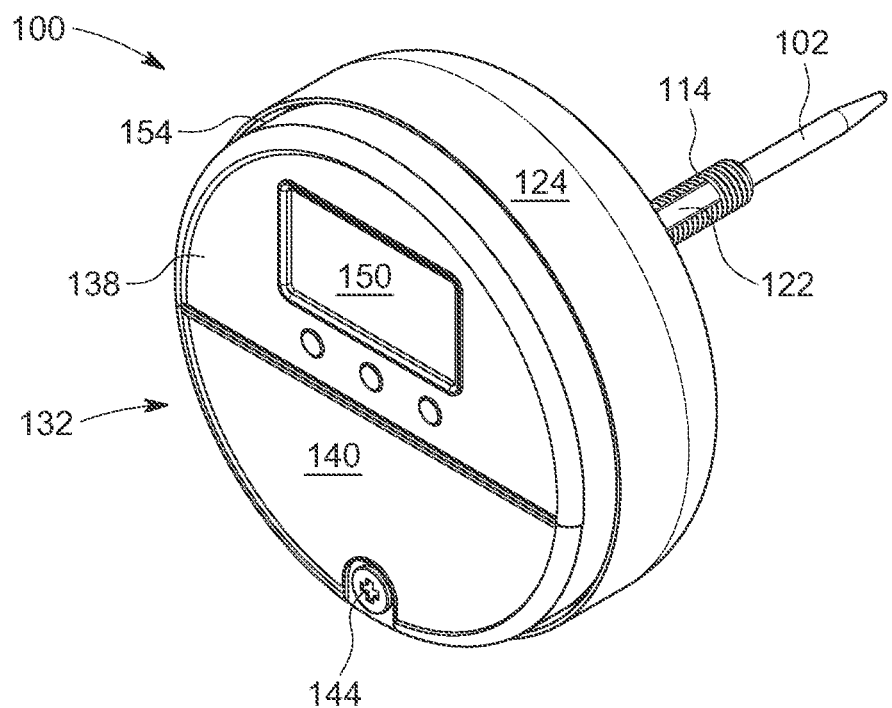
FIG. 2A is a perspective view of a front side of a digital thermometer for a cooking grill, in accordance with one embodiment of the present patent application.
Figure 2B:
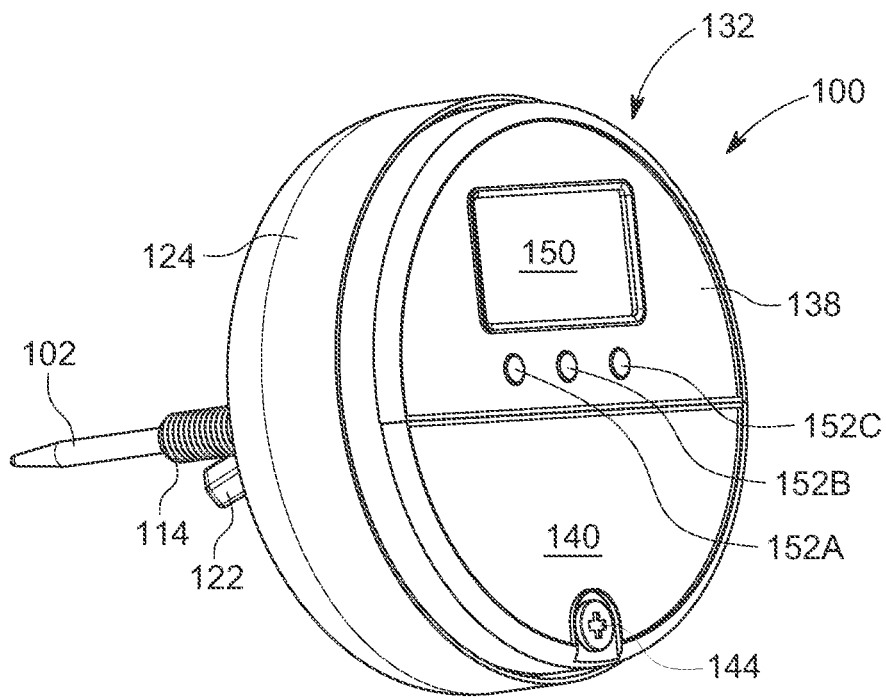
FIG. 2B is another perspective view of the front side of the digital thermometer shown in FIG. 2A.
Figure 2C:
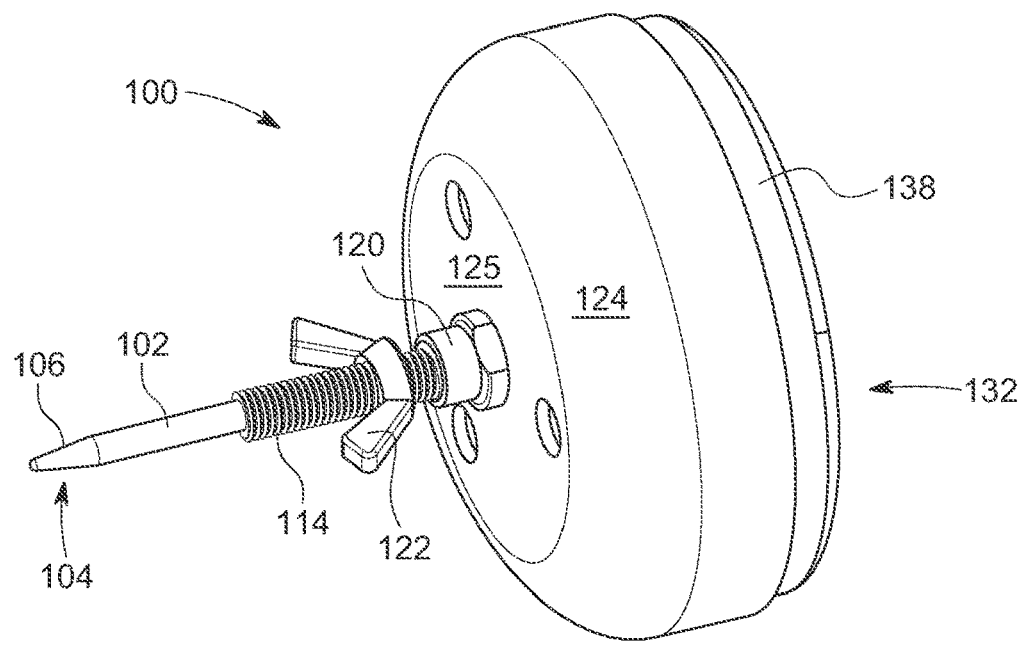
FIG. 2C is a perspective view of a rear side of the digital thermometer shown in FIGS. 2A and 2B.
Figure 2D:
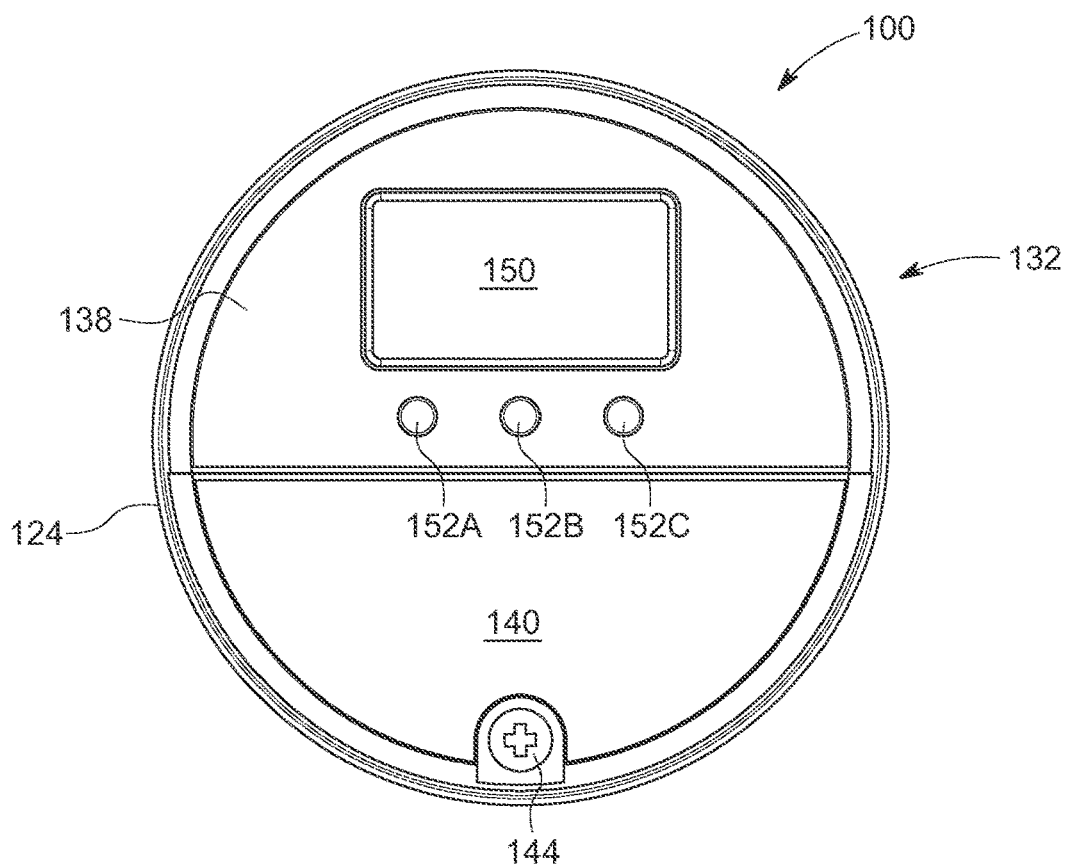
FIG. 2D is a front elevation view of the digital thermometer shown in FIGS. 2A-2C.
Figure 2E:
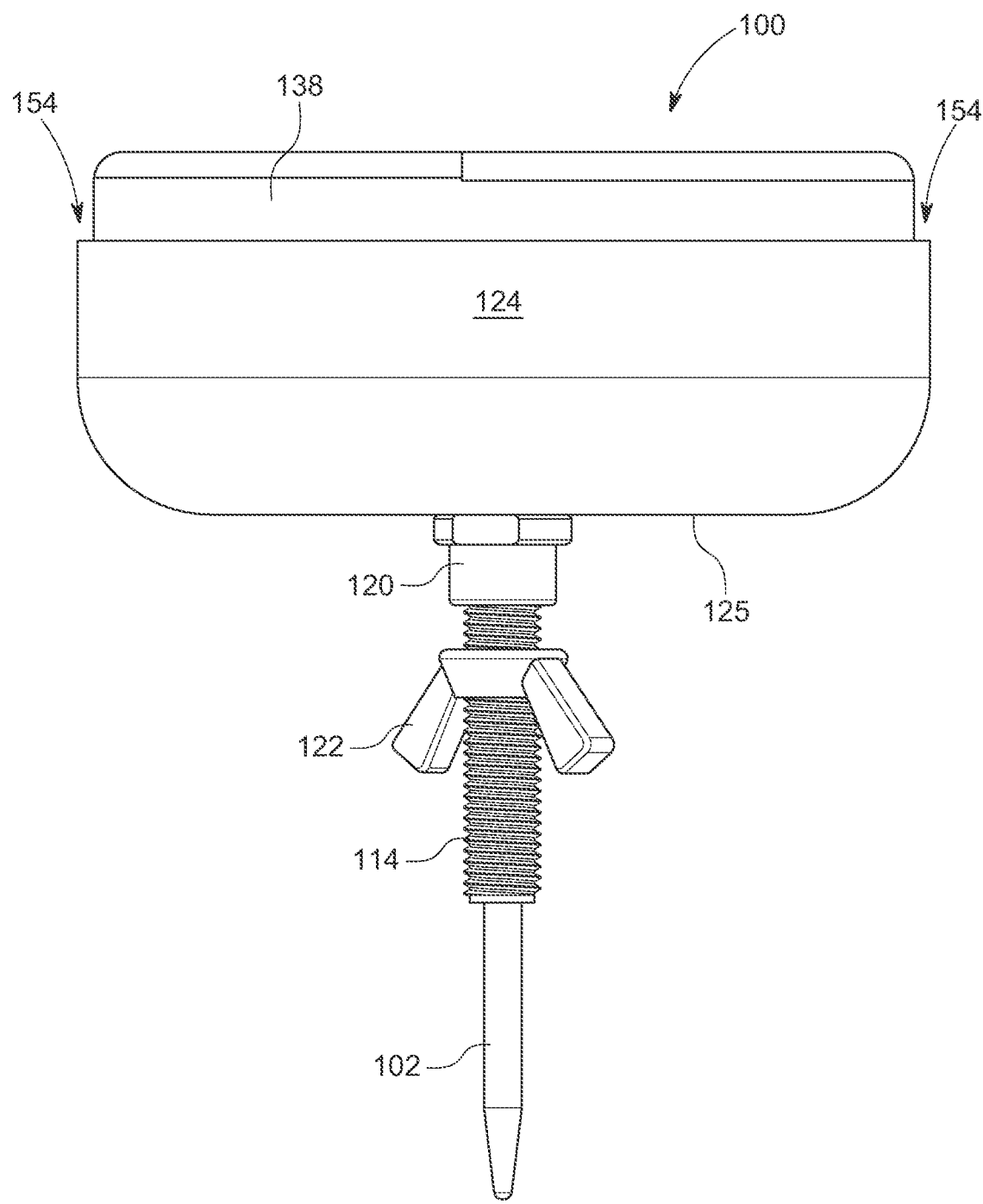
FIG. 2E is a side view of the digital thermometer shown in FIGS. 2A-2D.

Referring to FIGS. 2C and 2E, in one embodiment, the screw head 116 (FIG. 1B) at the upper end of the outer casing screw 114 preferably engages an inner surface of a bottom wall 124 of the outer casing 124 for securing an upper end of the outer casing screw 114 to the outer casing 124. The outer casing nut 120 preferably has internal threads that are adapted to mesh with the external threads of the outer casing screw 114 for securing the bottom wall 125 of the outer casing 124 between the screw head 116 (FIG. 1B) and the upper end of the outer casing nut 120. The outer casing screw 114 preferably has an elongated conduit extending along the length thereof, and the temperature sensing probe 102 is adapted to pass through the elongated conduit of the outer casing screw 114 so that the lower end of the temperature sensing probe 102 may project beyond the lower end of the outer casing screw 114.

Referring to FIGS. 2A-2C and 2E, in one embodiment, the digital thermometer 100 preferably includes the threaded fastener 122 that desirably has internal threads for being threaded onto the external threads of the outer casing screw 114. The threaded fastener 122 may be utilized for securing the digital thermometer 100 to the hood or cover of a barbeque grill with the temperature sensing probe 102 located inside the grill and the outer casing 124 and the housing 132 for the electronic components being located outside the grill, as will be described in more detail herein.

Figures 3A, 3B:
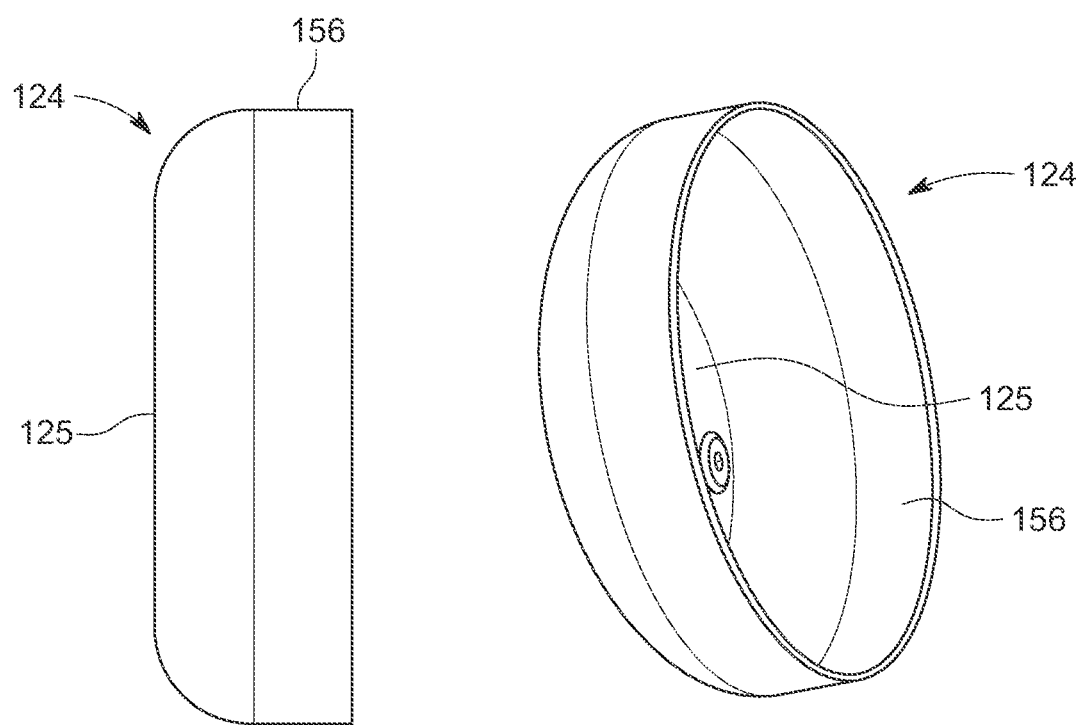
FIG. 3A is a side view of an outer casing of a digital thermometer for a cooking grill, in accordance with one embodiment of the present patent application.
FIG. 3B is a perspective view of a front side of the outer casing shown in FIG. 3A.
Figure 3C:
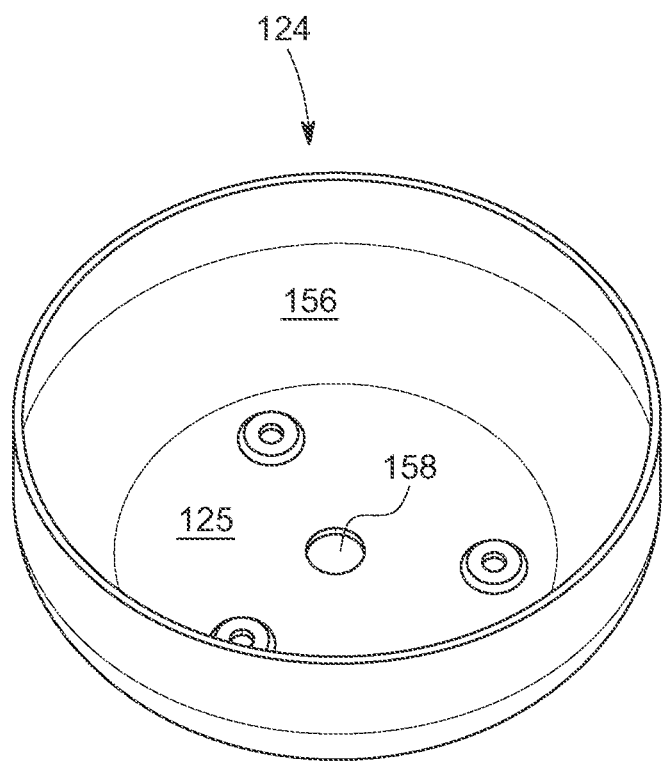
FIG. 3C is another perspective view of the front side of the outer casing shown in FIGS. 3A and 3B.

Referring to FIGS. 3A-3C, in one embodiment, the outer casing 124 of a digital thermometer preferably includes the bottom wall 125 and a side wall 156 that extends upwardly from the bottom wall 125. In one embodiment, the outer casing 124 preferably has a bowl-like shape with an upper end that is open for receiving the insulating assembly 126, the housing base 137, the printed circuit board 134, and the housing cover 138 shown and described above in FIGS. 1A-1B. In one embodiment, the bowl-shaped outer casing 124 preferably a front side that defines a concave shape and a rear side that defines a convexly curved shape.

Referring to FIG. 3C, in one embodiment, the bottom wall 125 of the outer casing 124 preferably includes a central opening 158 that is adapted to receive the outer casing screw 114 that is shown and described above in FIGS. 1A-1B, 2A-2C, and 2E. In one embodiment, when the outer casing screw is assembled with the outer casing 124, the screw head 116 (FIG. 1B) of the outer casing screw is preferably adapted to overlie an inner surface of the bottom wall 125 of the outer casing 124.

Figure 4A:
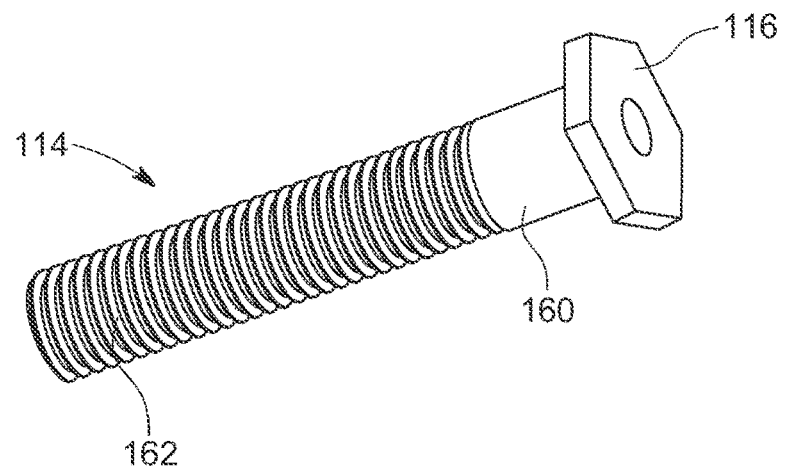
FIG. 4A is a perspective view of an outer casing screw that is assembled with the outer casing of FIGS. 3A-3C, in accordance with one embodiment of the present patent application.
Figure 4B:
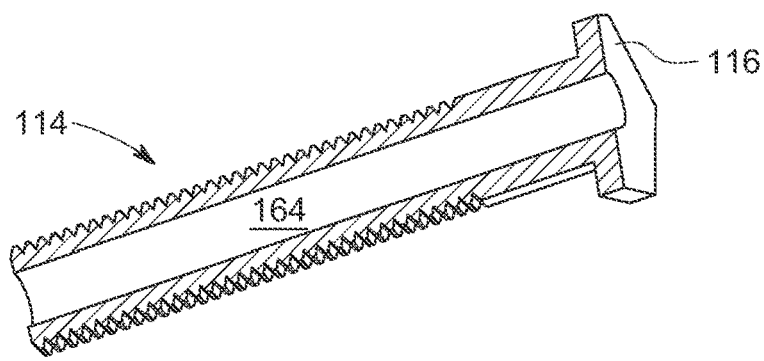
FIG. 4B is a cross-sectional view of the outer casing screw shown in FIG. 4A.

Referring to FIGS. 4A and 4B, in one embodiment, the outer casing screw 114 preferably has an elongated shaft 160 having external threads 162. The outer casing screw 114 preferably has the screw head 116 provided at an upper end thereof. The outer casing screw 114 desirably includes an elongated conduit 164 that extends from the upper end to the lower end of the outer casing screw 114. The elongated conduit 164 preferably passes through the entire length of the outer casing screw including the screw head 116. As will be described in more detail herein, the elongated conduit 164 of the outer casing screw 114 is adapted to receive the temperature sensing probe 102 so that the temperature sensing probe may pass through the length of the outer casing screw 114 and into the interior of the outer casing 124 (FIG. 3A-3C).

Figure 5A:
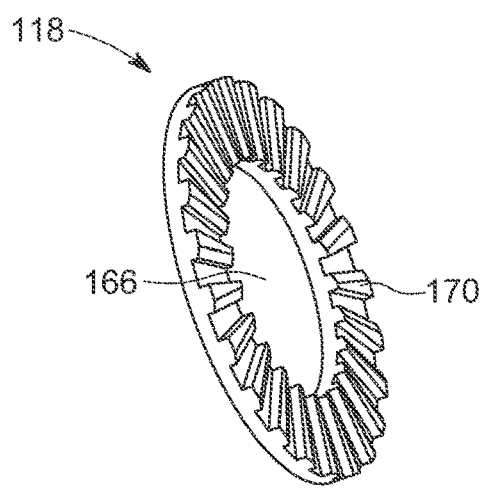
FIG. 5A is a perspective view of an outer casing washer that is assembled with the outer casing screw of FIGS. 4A-4B, in accordance with one embodiment of the present patent application.
Figure 5B:
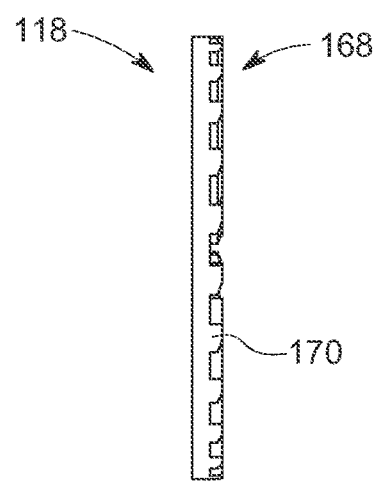
FIG. 5B is a side elevation view of the outer casing washer shown in FIG. 5A.

Referring to FIGS. 5A and 5B, in one embodiment, the digital thermometer disclosed herein preferably includes an outer casing washer 118 that has a central opening 166 that is adapted to receive the elongated shaft 160 of the outer casing screw 114 (FIGS. 4A-4B). The outer casing washer 118 preferably has a front face 168 having a roughened surface 170 (e.g., grooves, knurling) that extends around the central opening 166 of the outer casing washer 118. The roughened surface 170 is preferably adapted to engage the screw head of the outer casing screw for forming a secure connection between the screw head and the bottom wall 125 (FIG. 3C) of the outer casing.

Figure 6A:
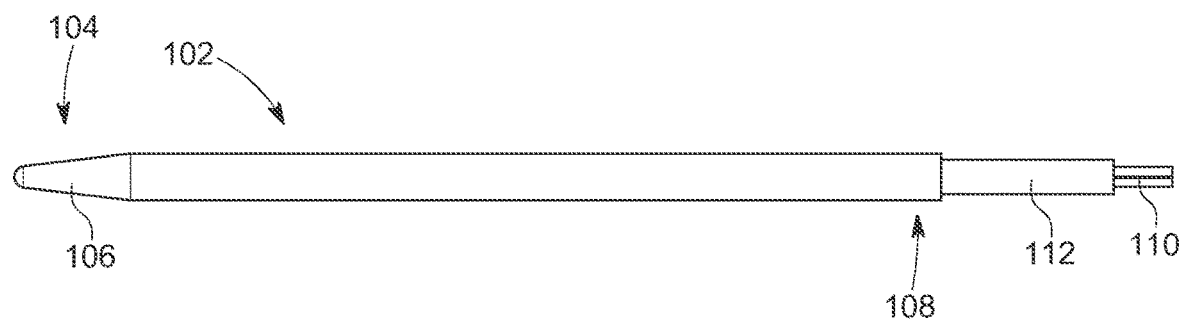
FIG. 6A is a side view of a temperature sensing probe of a digital thermometer, in accordance with one embodiment of the present patent application.
Figure 6B:
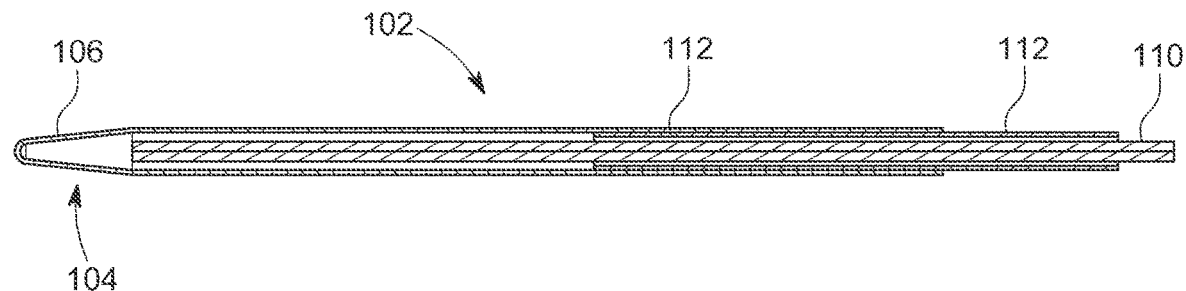
FIG. 6B is a cross-sectional view of the temperature sensing probe shown in FIG. 6A.
Figure 6C:
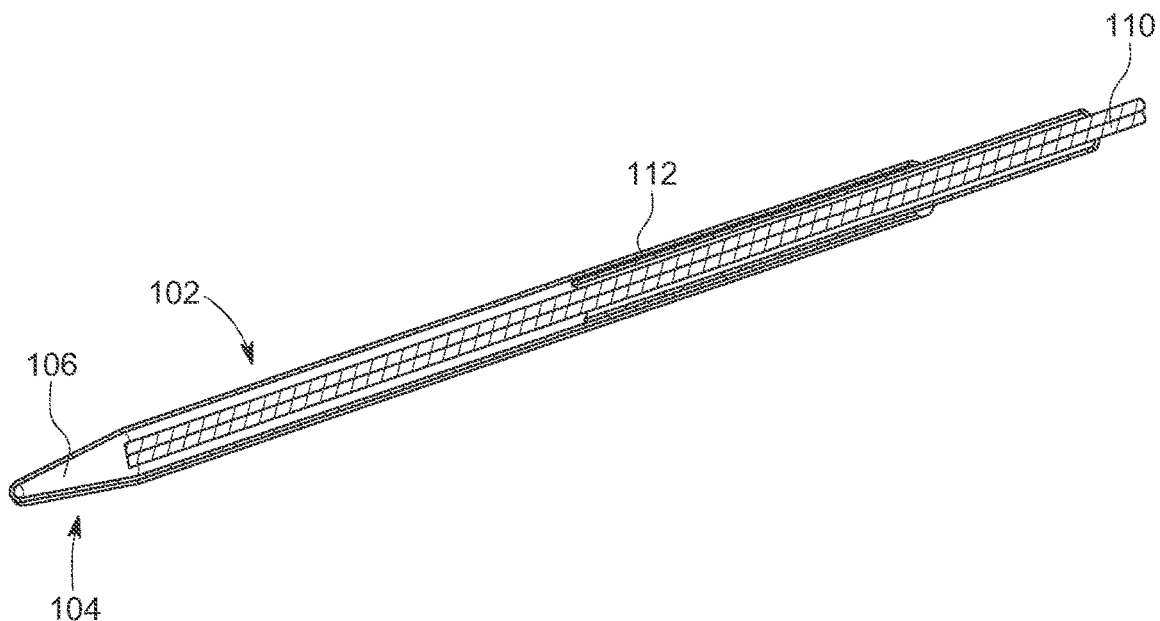
FIG. 6C is another cross-sectional view of the temperature sensing probe shown in FIGS. 6A and 6B.

Referring to FIGS. 6A-6C, in one embodiment, the digital thermometer preferably includes the temperature sensing probe 102 (FIGS. 1A and 1B) having the lower end 104 with the pointed tip 106 and the upper end 108 that receives the wire 110 connected to a temperature sensor and the insulating tube 112. In one embodiment, the lower end of the wire 110 is adjacent the lower end of the temperature sensing probe 102 for obtain temperature readings and transmitting the sensed temperature readings to a central processing unit for generating temperature data that is displayed in a digital format on the display screen of the digital thermometer.

Figure 7:
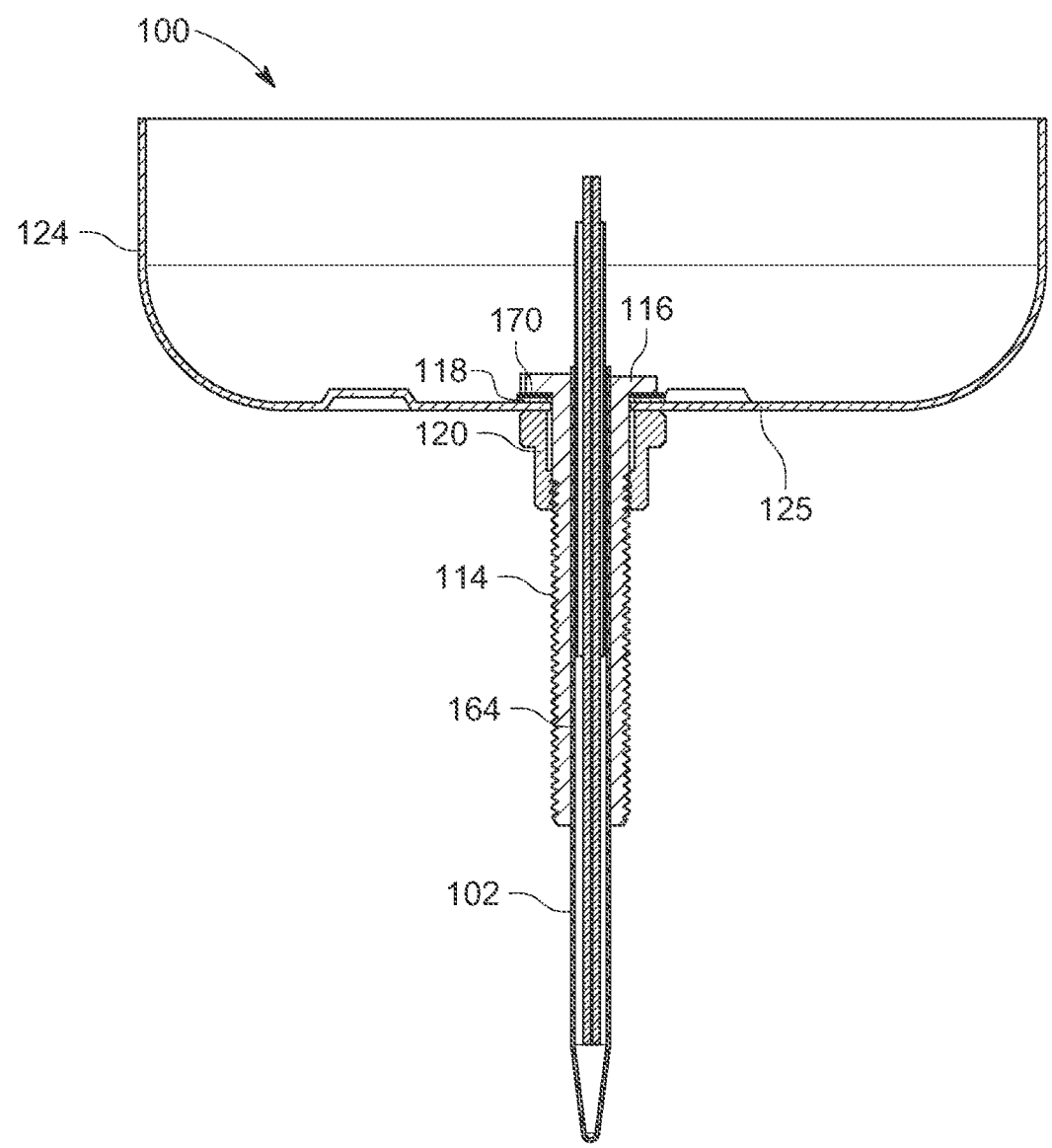
FIG. 7 is a cross-sectional view of the outer casing of FIGS. 3A-3C assembled with the outer casing screw of FIGS. 4A-4B, the outer casing washer of FIGS. 5A-5B, and the temperature sensing probe of FIGS. 6A-6C, in accordance with one embodiment of the present patent application.

Referring to FIG. 7, in one embodiment, a subassembly of the digital thermometer 100 preferably includes the outer casing screw 114, the outer casing washer 118, the outer casing nut 120, the temperature sensing probe 102, and the outer casing 124. In one embodiment, in order to assemble the components of the subassembly together, the outer casing washer 118 is aligned with the central opening 158 (FIG. 3C) formed in the bottom wall 125 of the outer casing 124. The elongated shaft of the outer casing screw 114 is preferably passed through the aligned central opening 166 of the outer casing washer 118 and the central opening 158 of the bottom wall 125 of the outer casing 124 so that the screw head 116 of the outer casing screw 114 lies over the outer casing washer 118 and so that the elongated shaft of the outer casing screw 114 extends below the bottom wall 125 of the outer casing 124. In one embodiment, the roughened top surface 170 (FIGS. 5A and 5B) of the outer casing washer 118 preferably engages an underside of the screw head 116 of the outer casing screw 114.

In one embodiment, the temperature sensing probe 102 may be passed through the elongated conduit 164 (FIG. 4B) that extends through the elongated shaft of the outer casing screw 114. The internal threads of the outer casing nut 120 are preferably threaded onto the external threads of the outer casing screw 114, and the outer casing nut 120 is tightened onto the outer casing screw 114 until the bottom wall 125 of the outer casing 124 is compressed between the screw head 116 and the outer casing washer 118 on a top side of the bottom wall 125, and an upper end of the internally threaded nut 120 on a bottom side of the bottom wall 125.

Figure 8A:
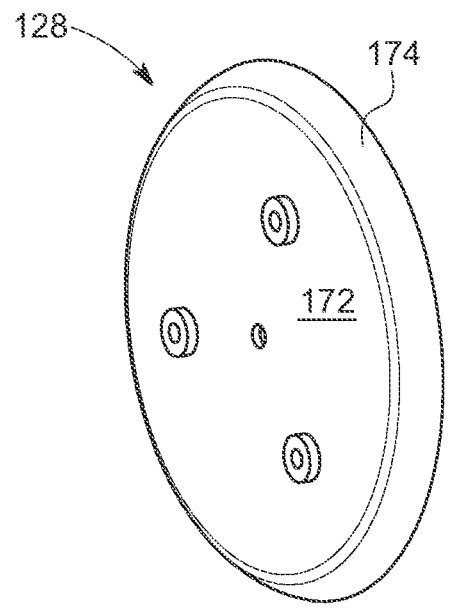
FIG. 8A is a perspective view of a rear face of a bottom insulating layer of an insulating assembly of a digital thermometer, in accordance with one embodiment of the present patent application.
Figure 8B:
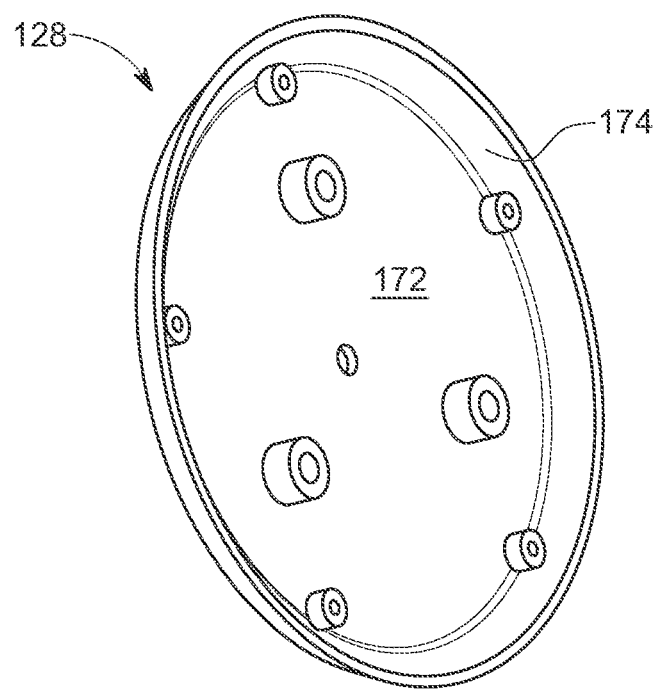
FIG. 8B is a perspective view of a front face of the bottom insulating layer of the insulating assembly shown in FIG. 8A.

Referring to FIGS. 8A and 8B, in on embodiment, the digital thermometer 100 (FIGS. 1A and 1B) preferably includes the insulating assembly 126 (FIG. 1A) having the bottom insulting layer 128 with a bottom wall 172 and an outer rim 174 that projects upwardly from the bottom wall 172.

Figure 9A:
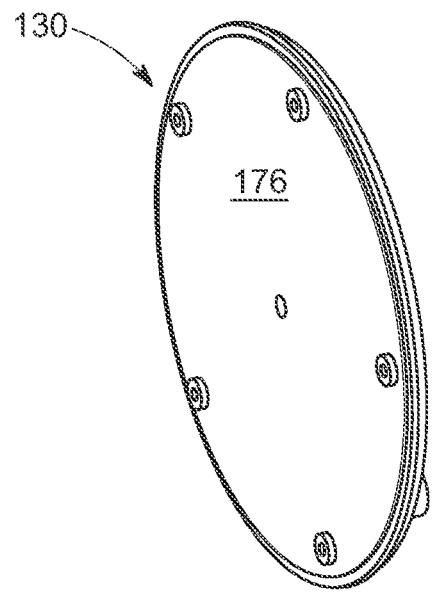
FIG. 9A is a perspective view of a rear face of a top insulting layer of an insulating assembly of a digital thermometer, in accordance with one embodiment of the present patent application.
Figure 9B:
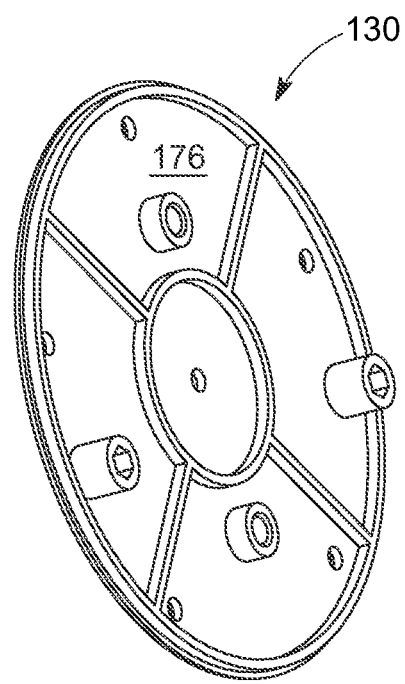
FIG. 9B is a perspective view of a front face of the top insulating layer of the insulating assembly shown in FIG. 9A.

Referring to FIGS. 9A and 9B, in one embodiment, the insulating assembly 126 (FIGS. 1A and 1B) preferably includes the top insulating layer 130 having a top wall 176. Referring to FIGS. 8A-8B and 9A-9B, in one embodiment, the top and bottom insulting layers 128, 130 desirably include internally threaded openings that adapted to receive threaded fasteners for securing the bottom and top insulting layers 128, 130 together to form a double-walled insulating assembly 126 (FIGS. 1A and 1B). In one embodiment, after the bottom and top insulating layers 128, 130 of the insulating assembly are secured together, the insulating layers 128, 130 form a double-walled structure having an insulting air gap that extends between the bottom wall 172 of the bottom insulting layer 128 and the top wall 176 of the top insulting layer 130 to provide additional insulation between the bottom and top insulating layers of the insulating assembly. As will be described in more detail herein, the insulating assembly is configured for insertion inside the outer casing 124 (FIGS. 3A-3C) and is adapted to insulate the electronic components of the digital thermometer from heat and/or direct the heat of a cooking grill away from the electronic components of the digital thermometer.

Figure 10A:
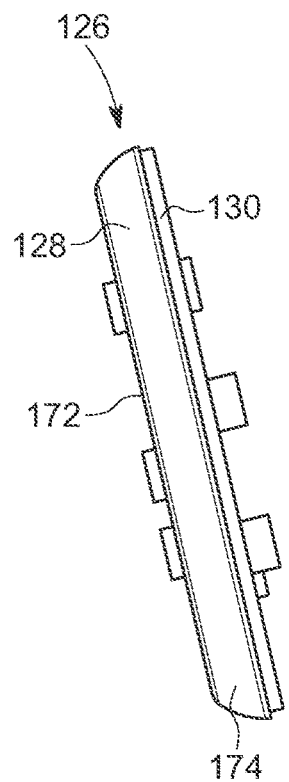
FIG. 10A is a side view of an insulating assembly including the bottom insulating layer of FIGS. 8A-8B and the top insulating layer of FIGS. 9A-9B, in accordance with one embodiment of the present patent application.
Figure 10B:
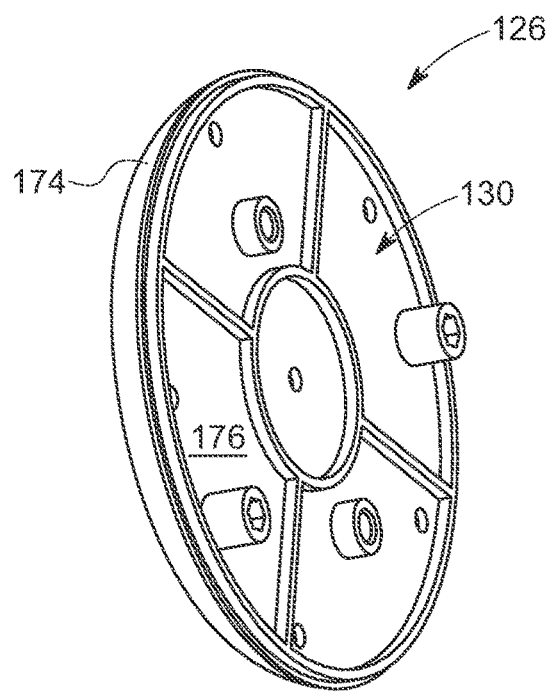
FIG. 10B is a perspective view of a front side of the insulating assembly shown in FIG. 10A.

Referring to FIGS. 10A and 10B, in one embodiment, the top insulating layer 130 of the insulating assembly 126 is preferably assembled with the bottom insulating layer 128 of the insulting assembly so that the outer rim 174 of the bottom insulating layer surrounds the outer perimeter of the top insulating layer 130. In one embodiment, the outer surface of the outer rim 174 has a convexly curved surface that is adapted to engage a concave surface inside the outer casing for seating the insulating assembly within the outer casing. In one embodiment, the bottom wall 172 of the bottom insulating layer 128 is preferably spaced away from the top wall 176 of the top insulating layer 130 to provide an insulating air gap therebetween.

Figure 11:
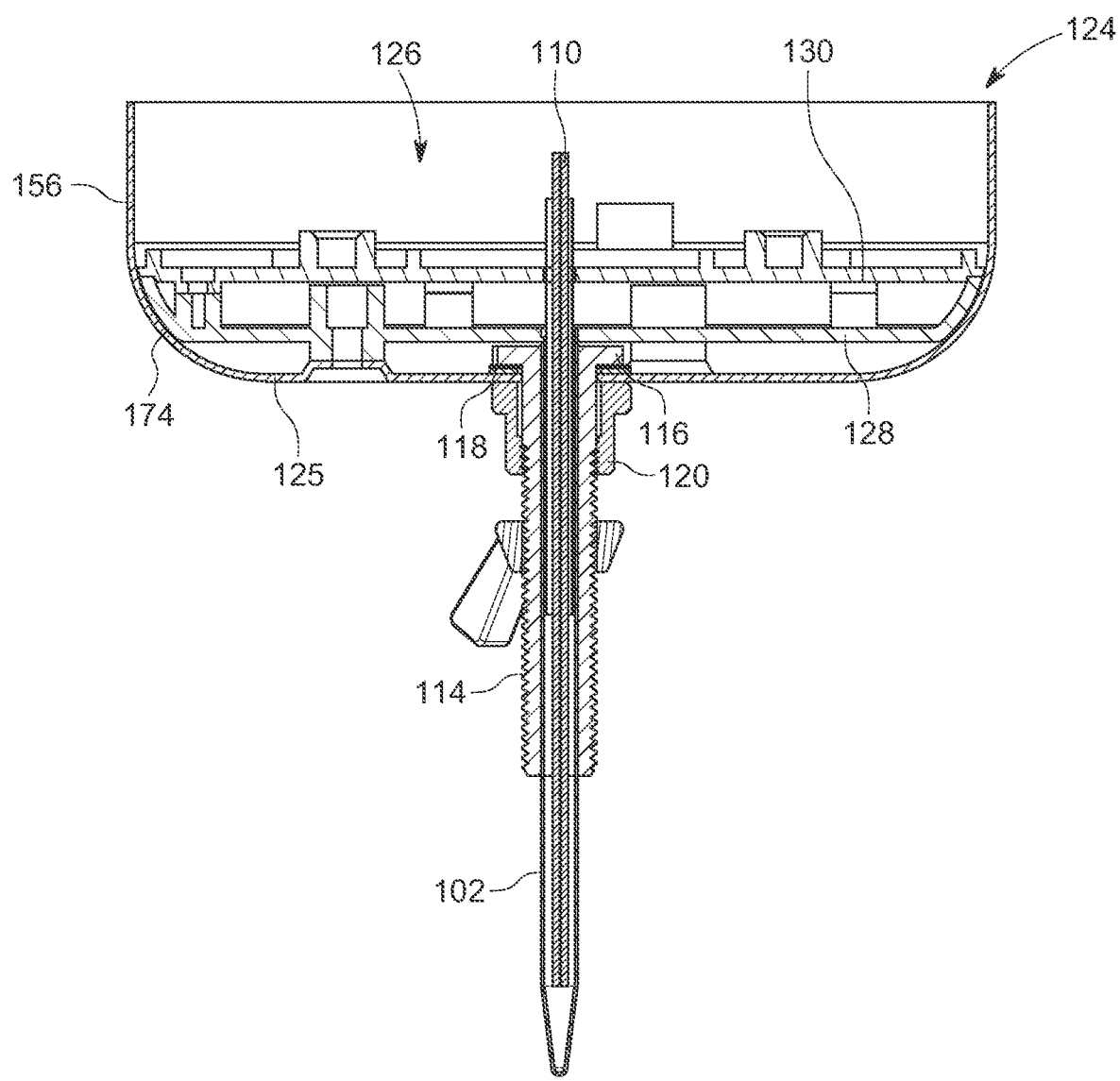
FIG. 11 is a cross-sectional view of the subassembly shown in FIG. 7 with the insulating assembly of FIGS. 10A-10B secured inside the outer casing, in accordance with one embodiment of the present patent application.

Referring to FIG. 11, in one embodiment, the insulating assembly 126 shown and described above in FIGS. 8A-10B, may be positioned inside the outer casing 124 and assembled with the outer casing 124 by juxtaposing the bottom insulating layer 128 of the insulating assembly 126 with the inner surface of the bottom wall 125 of the outer casing 124. The outer rim 174 of the bottom insulating layer 128 preferably has a convexly-curved surface that abuts against a concave-shaped inner surface of the side wall 156 of the outer casing 124 for seating the insulating assembly 126 inside the outer casing 124. The bottom and top insulating layers 128, 130 of the insulating assembly 126 preferably have respective openings that are aligned with the openings provided in the screw head 116 of the outer casing screw 114, the washer 118, and the outer casing nut 120 so that the upper end of the temperature sensing probe 102 and the wire 110 may pass through the insulating assembly 126 for being coupled with the electronic components of the digital thermometer that are disposed within the housing. As will be described in more detail herein, the wire 110 (e.g., a thermocouple wire) is preferably connected with the electronic components on the printed circuit board 134 (FIG. 1B) for providing the sensed temperature data obtained by the temperature sensing probe 102 to the electronic components so that a digital temperature reading may be calculated and displayed on the temperature display screen 150 (FIG. 2A). In one embodiment, the temperature sensor in the temperature sensing probe may include a thermocouple, a thermistor and/or an RTD.

Figure 12A:
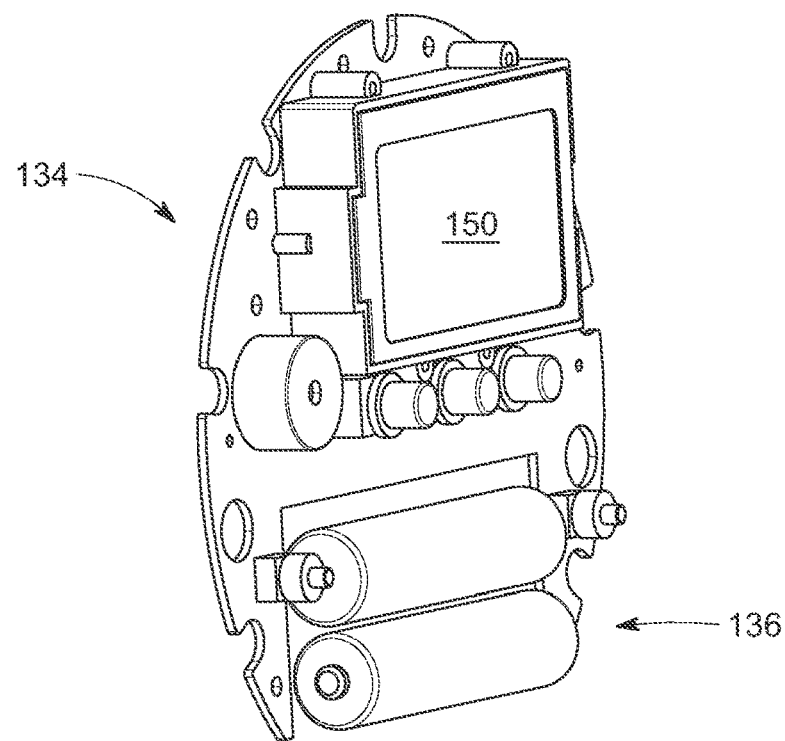
FIG. 12A is a perspective view of a front side of a printed circuit board for a digital thermometer, in accordance with one embodiment of the present patent application.
Figure 12B:
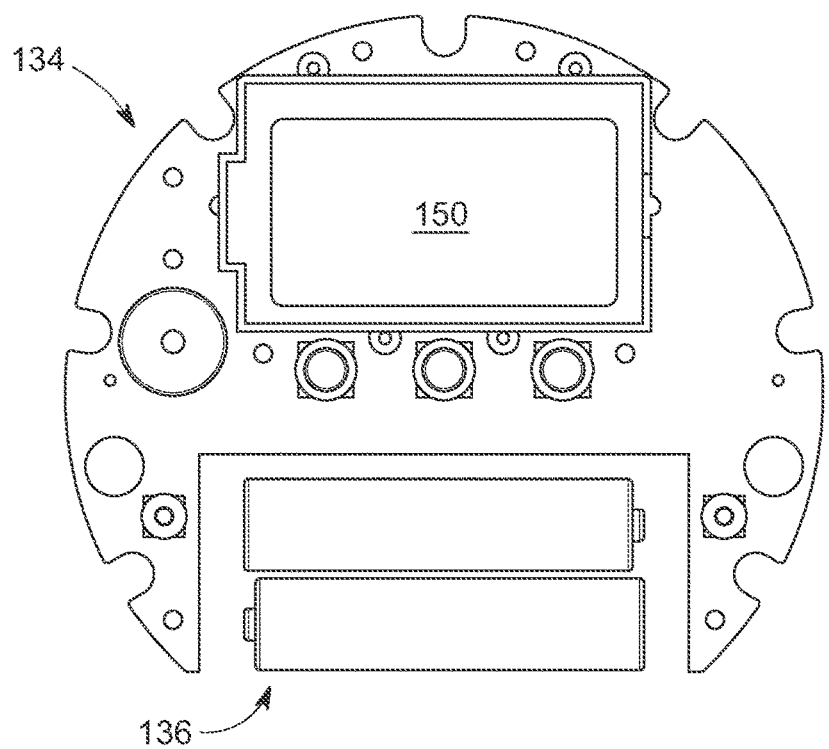
FIG. 12B is a top plan view of the front side of the printed circuit board shown in FIG. 12A.

Referring to FIGS. 12A and 12B, in one embodiment, the digital thermometer preferably includes a printed circuit board 134 that has electronic components provided thereon that are adapted to receive the sensed temperature information from the temperature sensing probe 102 (FIG. 1B) and transform the information into a digital temperature display that appears on the temperature display screen 150 (FIG. 2A). In one embodiment, the printed circuit board 134 may seat electronic components such as one or more microprocessors, one or more microcontrollers, and one or more memory devices for utilizing the sensed temperature data and providing a digital temperature output that is displayed on the temperature display screen 150. In one embodiment, one or more of the electronic components may be directly mounted onto a surface of the printed circuit board using surface mount technology (SMT).

In one embodiment, the electronic components may include a socket type microprocessor, such as a heat resistant microprocessor. In one embodiment, the electronic components may include a pinned terminal liquid crystal display that is resistant to heat, a backlight reflector for the LCD (e.g., a polycarbonate backlight reflector that is resistant to heat), and an elevated frame that holds the LCD component for insulating the LCD component from the heat generated by printed circuit board. The LCD unit may be directly mounted on the printed circuit board using pins (vs. a conventional rubber LCD connector). In one embodiment, the digital thermometer may include waterproof tape that covers the exposed edges of the LCD component to prevent moisture influx. In one embodiment, the printed circuit board 134 preferably includes a region that is adapted to receive a power source 136, such as batteries, which provides power to the electronic components of the digital thermometer.

Figure 13:
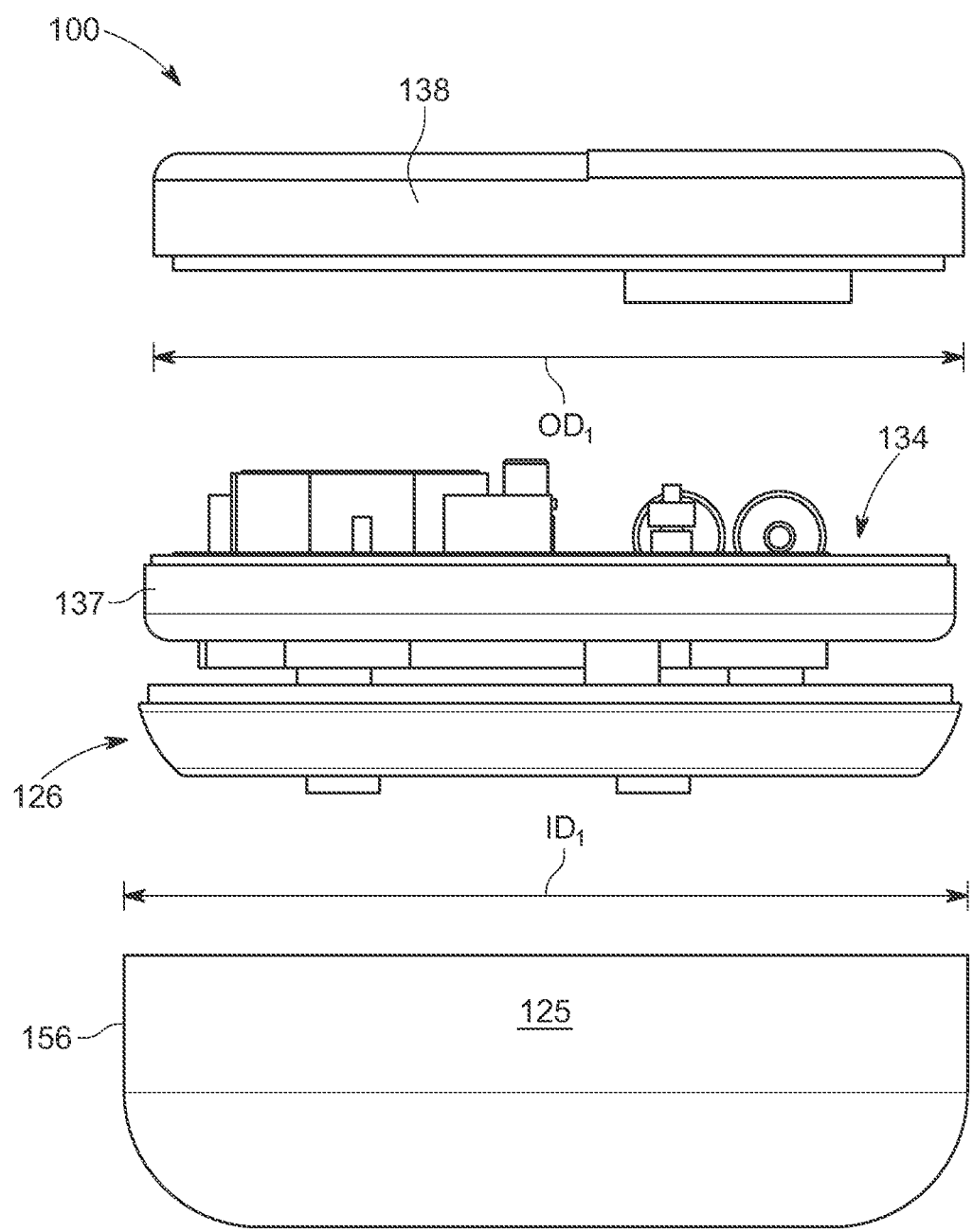
FIG. 13 is a side view of a step of a method of assembling together a housing cover, a printed circuit board, a housing base, an insulating assembly, and an outer casing, in accordance with one embodiment of the present patent application.

Referring to FIG. 13, in one embodiment, the digital thermometer 100 preferably includes the outer casing 124 that is adapted to receive the insulating assembly 126, the housing base 137, the printed circuit board 134, and the housing cover 138. In one embodiment, the electronic components are mounted over a top surface of the printed circuit board that faces away from the insulating assembly 126 and the housing base 137. In one embodiment, the outer wall 156 of the outer casing 124 defines an inner diameter $ID_1$ of about 91 mm, and the respective outer perimeters of the housing base 137 and the housing cover 138 define an outer diameter $OD_1$ of about 90 mm, which is about 1 millimeter smaller than the inner diameter $ID_1$ of the outer wall 156 of the outer casing 124. The 1 mm gap that is present between the respective outer perimeters of the housing base 137 and the housing cover 138 and the inner diameter of the outer wall 156 of the outer casing 124 provides a heat vent for venting heat that collects inside the outer casing 124 when the digital thermometer 100 is exposed to heat while recording temperature readings.

Figure 14:
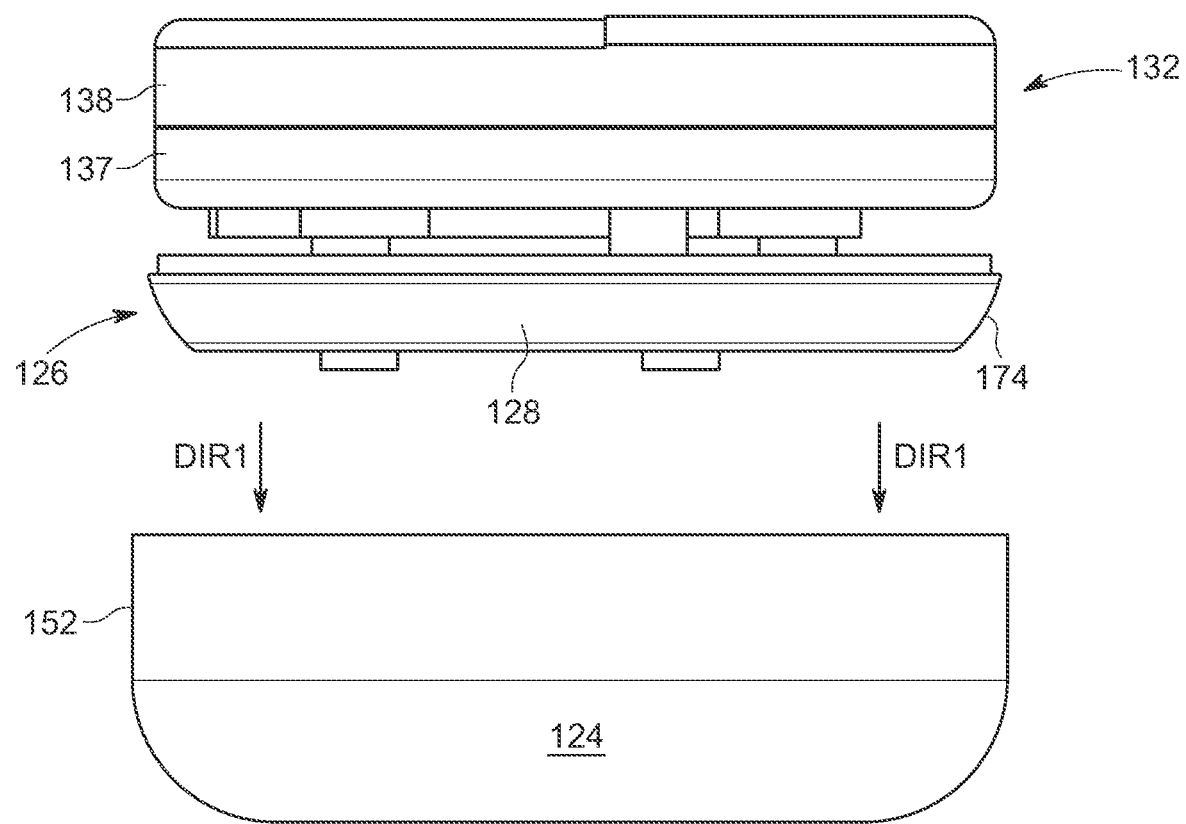
FIG. 14 is a side view of another step of a method of assembling together the housing cover, the printed circuit board, the housing base, the insulating assembly, and the outer casing of FIG. 13, in accordance with one embodiment of the present patent application.

Referring to FIG. 14, in one embodiment, a subassembly including the insulating assembly 126, and the housing 132 (including the housing base 137 and the housing cover 138) are joined together prior to inserting a lower end of the subassembly into an opening at the front side of the outer casing 124. In one embodiment, the bottom insulting layer 128 of the insulating assembly 126 is juxtaposed with the opening at the upper end of the outer wall 152 of the outer casing 124 and is moved in the direction designated DIR1 so that the convexly-curved outer perimeter 174 of the bottom layer 128 abuts against a concave inner surface of side wall 152 of the outer casing 124 (FIG. 11).

Figure 15:
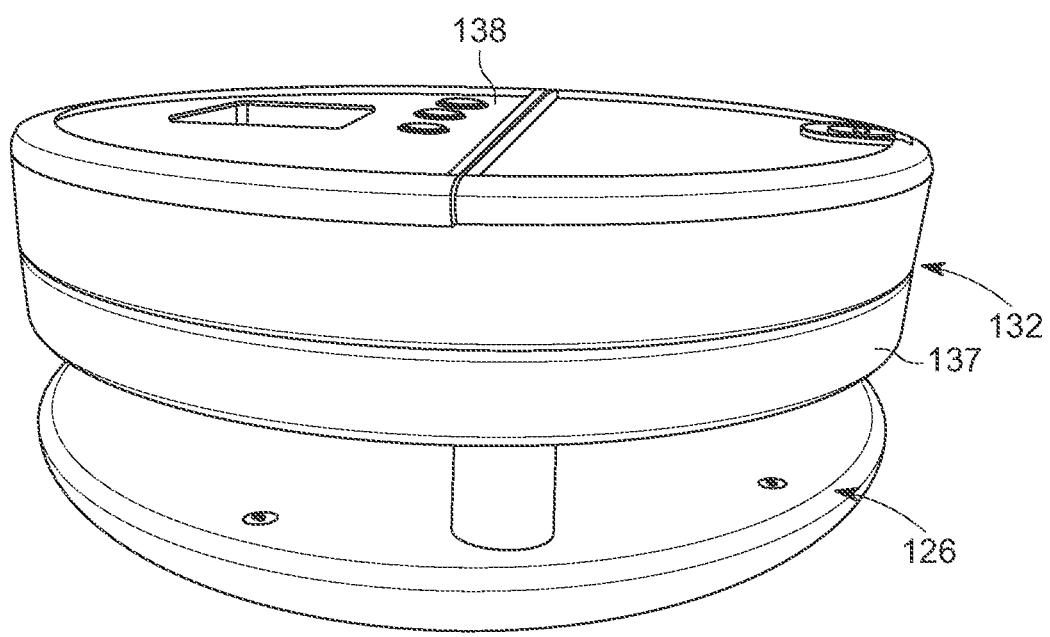
FIG. 15 is a perspective side view of a subassembly for a digital thermometer including a housing cover, a housing base, and an insulating assembly, in accordance with one embodiment of the present patent application.

FIG. 15 shows a subassembly including the insulating assembly 126 and the housing 132. The housing for the electronic components preferably includes the housing base 137 and the housing cover 138. The subassembly of FIG. 15 is insertable into the opening at the upper end of the outer wall of the outer casing 124 (FIG. 14).

Figure 16:
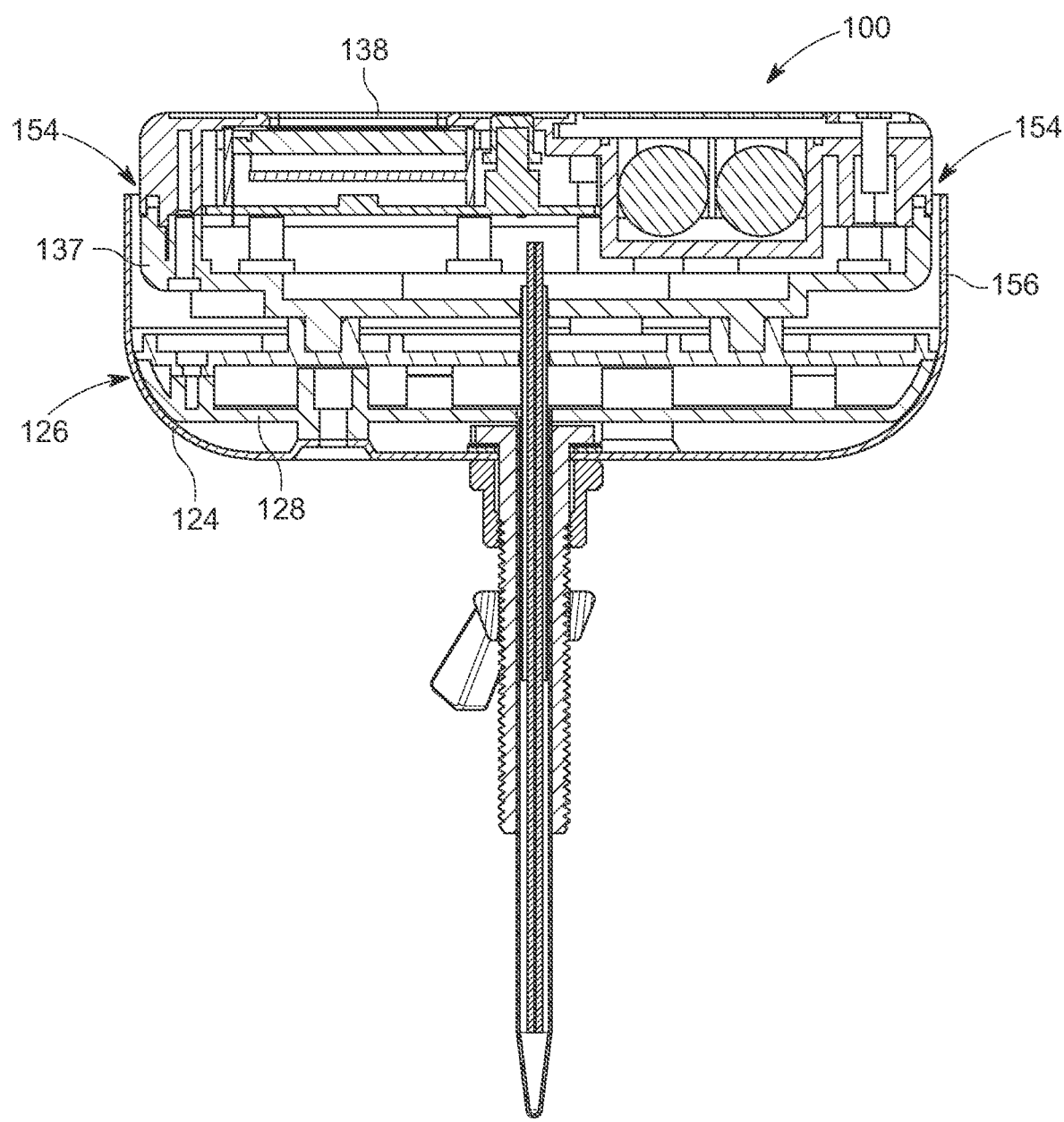
FIG. 16 is a cross-sectional view of a digital thermometer including an outer casing, a temperature sensing probe, an outer casing screw, an outer casing washer, an insulating assembly, a housing base, a printed circuit board, and a housing cover, in accordance with one embodiment of the present patent application.

Referring to FIG. 16, in one embodiment, the digital thermometer 100 preferably includes the outer casing 124 that seats the bottom insulating layer 128 of the insulating assembly 126, as well as the housing 132. The side wall 156 of the outer casing 124 preferably defines an inner diameter $ID_1$ that is greater than the outer diameter $OD_1$ of the outer perimeter of the housing 132. As a result, a heat vent 154 having a width $W_1$ of about 1 mm extends between the outer perimeter of the housing 132 and the inner surface of the outer wall 156 of the outer casing 124 to allow heat to vent out of and/or escape from the body of the digital thermometer 100.

Figure 17A:
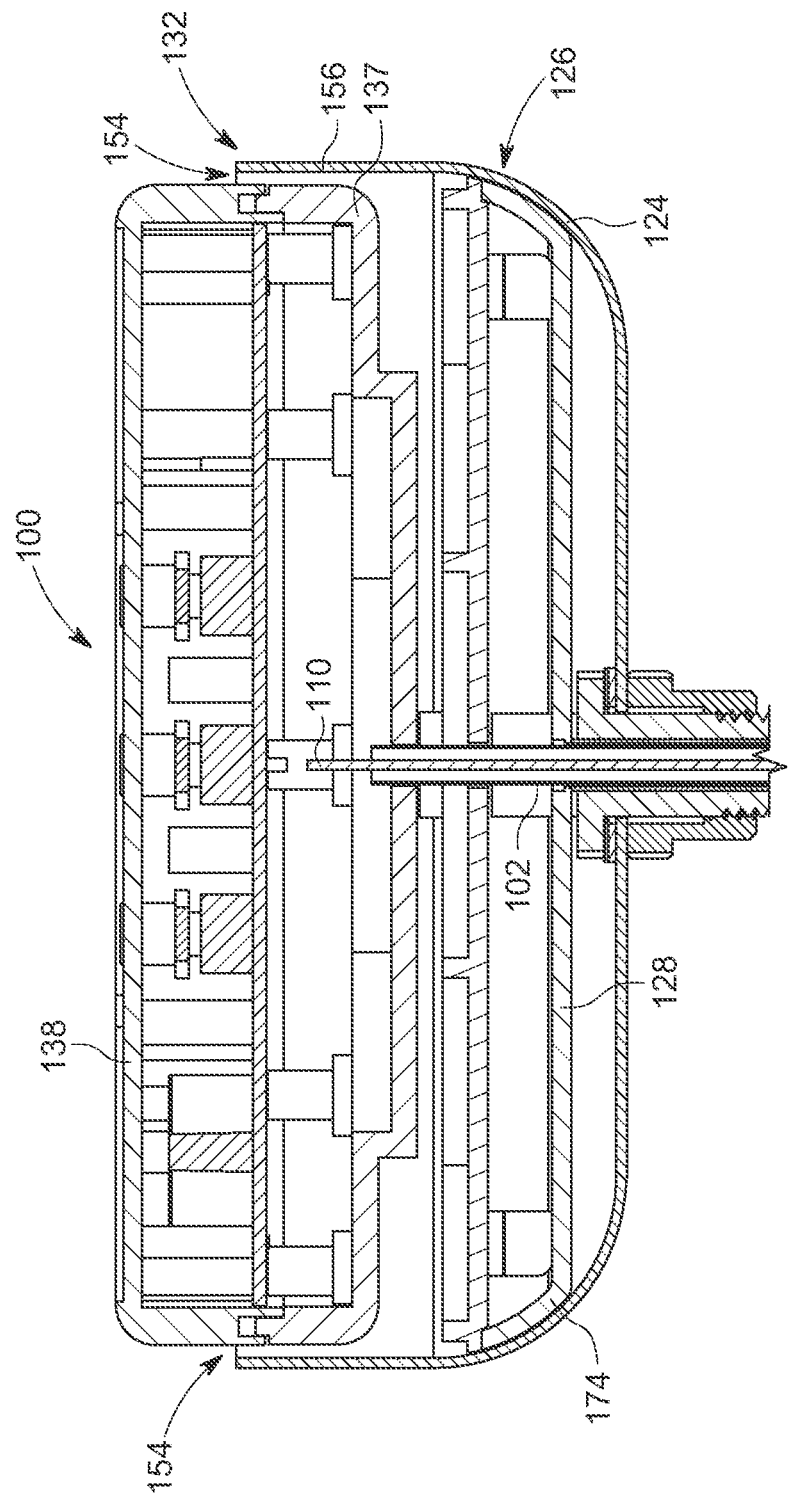
FIG. 17A is another cross-sectional view of the digital thermometer of FIG. 16 including the outer casing, the insulating assembly, the housing base, the printed circuit board, and the housing cover, in accordance with one embodiment of the present patent application.
Figure 17C:
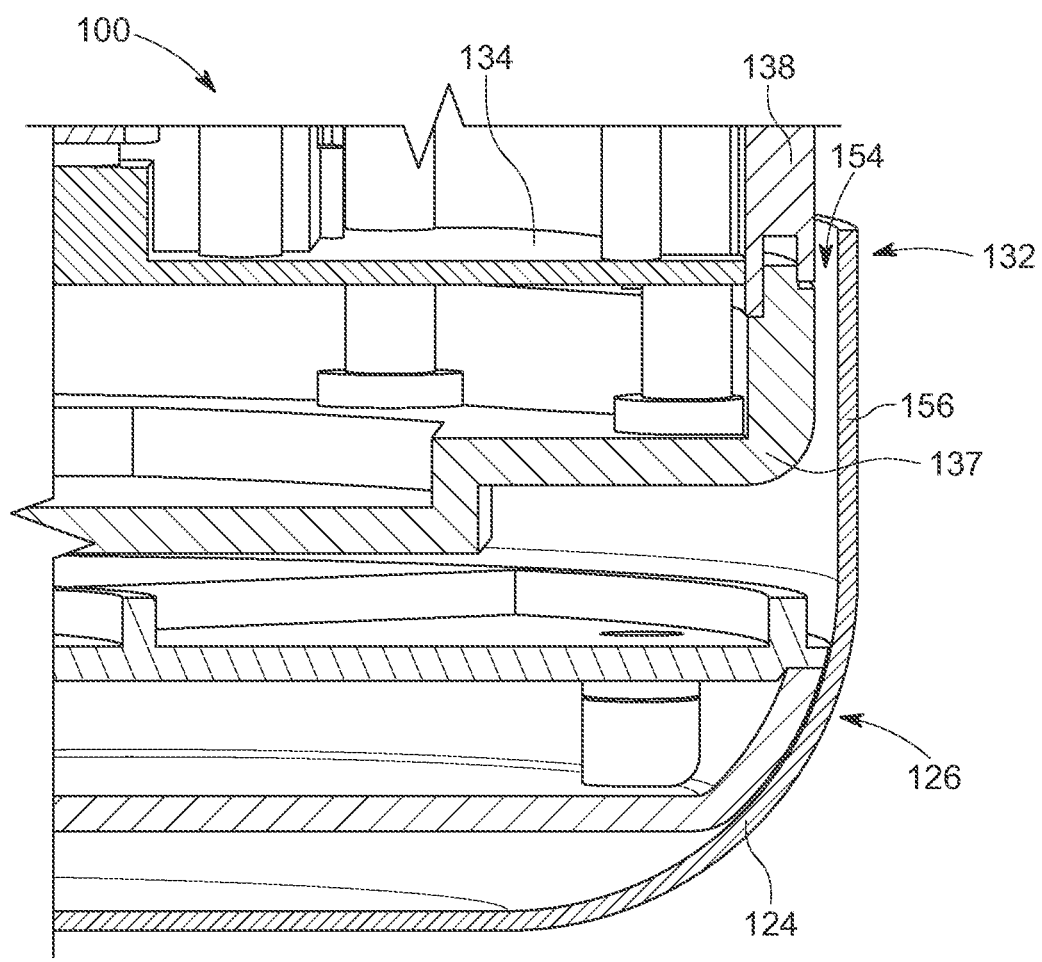
FIG. 17C is a magnified view of a section of the digital thermometer shown in FIG. 17B.

Referring to FIGS. 17A and 17B, in one embodiment, the digital thermometer 100 preferably includes the heat vent 154 that extends between the outer wall 156 of the outer casing 124 and the outer perimeter of the housing 132. The outer perimeter 174 of the bottom insulating layer 128 of the insulating assembly 126 preferably has a convexly curved surface that abuts against an opposing concave surface of the outer casing 124 for forming a stable seat and/or stable fit between the insulating assembly 126 and the outer casing 124 so that there is limited or no movement between the outer casing and the insulating assembly secured to the outer casing.

In one embodiment, the printed circuit board 134 containing electronic components is disposed inside the housing 132 (i.e., between the housing base 137 and the housing cover 138). The wire 110 coupled with the temperature sensor desirably extends from the upper end of the temperature sensing probe 102 and is preferably electrically interconnected with the electronic components provided on the printed circuit board 134 for providing sensed temperature data to the electronic components. The electric components on the printed circuit board 134 preferably utilize the sensed temperature data and transform the information into digital temperature data that is displayed on the visual display 150 (FIG. 2A), which may be visible through the housing cover 138.

Referring to FIG. 17B-1, the heat vent 154 preferably extends between the inner surface of the outer wall 156 of the outer casing 124 and the outer perimeter of the housing 132, which enables heat to escape from the digital thermometer 100. The configuration of the outer casing 124, the insulating assembly 126, and the housing 132 preferably directs heat away from the electronic components mounted on the printed circuit board 134 and located inside the housing 132.

Figure 18:
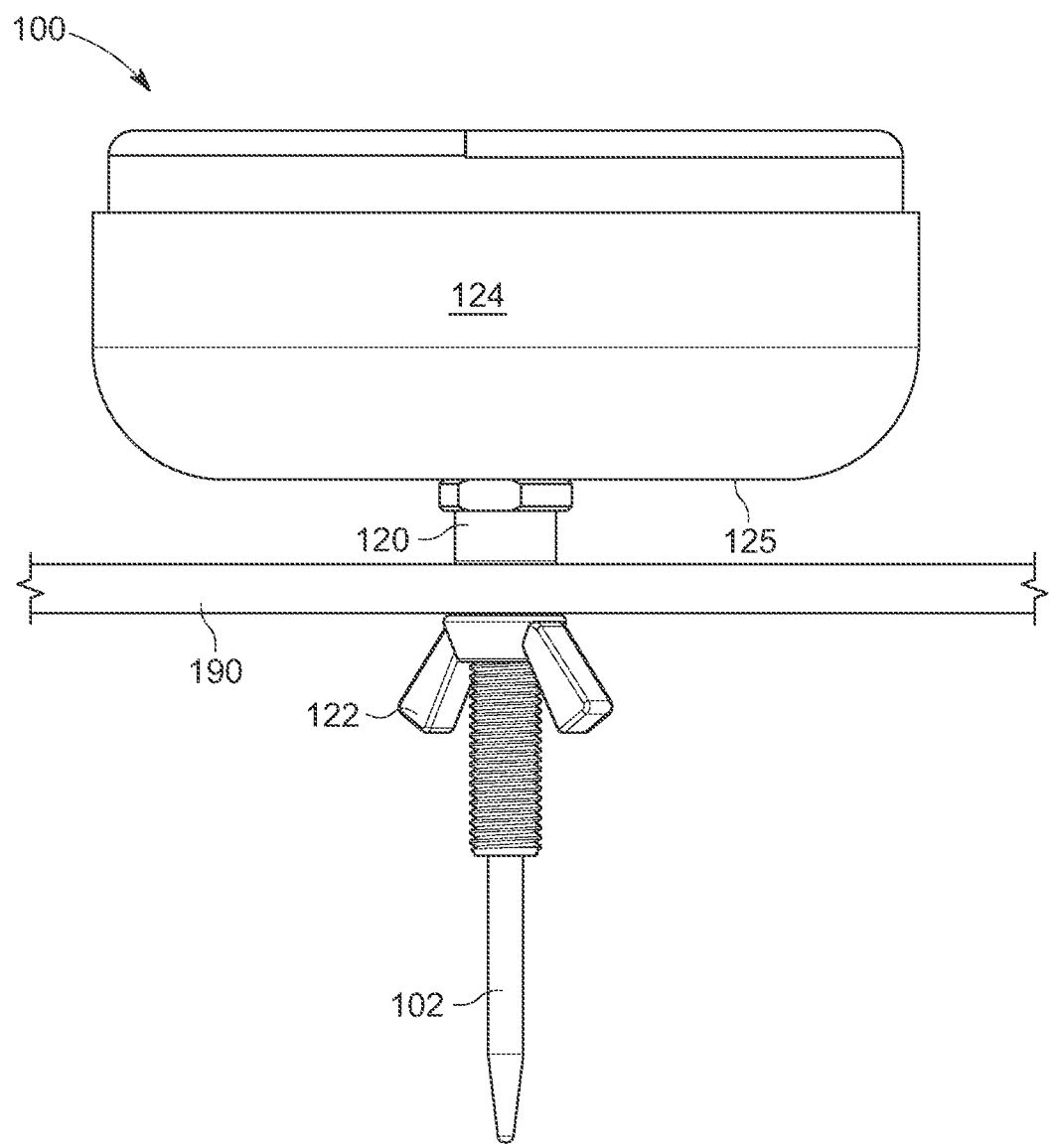
FIG. 18 is a side view of a digital thermometer secured to a hood of a barbeque grill, in accordance with one embodiment of the present patent application.

Referring to FIG. 18, in one embodiment, the digital thermometer 100 may be secured to the cover or hood 190 of a barbeque grill so that the temperature sensing probe 102 is disposed inside the hood of the barbeque grill and the outer casing 124 and the housing 132 for the electronic components are located outside the hood 190 of the barbeque grill. Heat that builds up inside the body of the digital thermometer 100 is preferably dissipated through the heat vent 154 that extends between the outer wall 156 of the outer casing 124 and the outer perimeter of the housing 132.

In one embodiment, the digital thermometer disclosed herein uses a combination of stainless steel outer casings, Bakelite insulating layers, high temperature thermoplastics for heat dissipation, insulation, and water-proof components to provide a unit that is adapted to effectively operate in high temperature environments. In one embodiment, the digital thermometer disclosed herein may effectively and accurately operate for up to 12 hours or more in temperature environments of 200-1,000 degrees Fahrenheit.

Figure 19A:
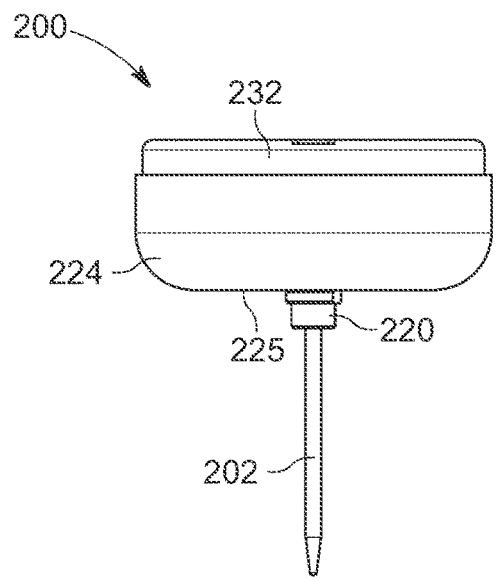
FIG. 19A is a side view of a digital thermometer having a temperature sensing probe, in accordance with one embodiment of the present patent application.
Figure 19B:
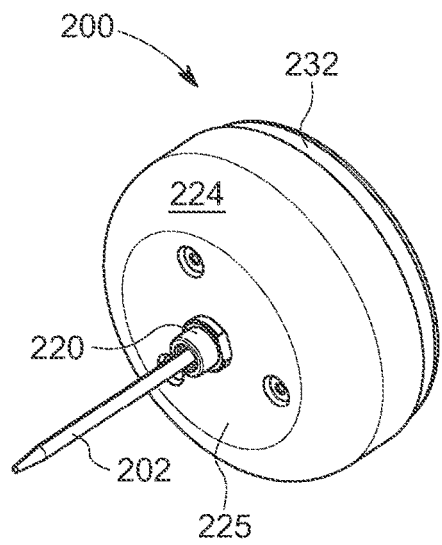
FIG. 19B is a perspective view of a rear side of the digital thermometer shown in FIG. 19A.

Referring to FIGS. 19A and 19B, in one embodiment, a digital thermometer 200 may be secured to the cover of a grill so that the temperature sensing probe 202 of the digital thermometer is disposed inside the cover of the grill (for obtaining temperature readings), and the outer casing 224 and the housing 232 that contains the electronic components is located outside the cover of the grill (for protecting the electronic components from being exposed to excessive heat). In one embodiment, the digital thermometer preferably includes a spacing element or shoulder that spaces the bottom wall 225 of the outer casing 224 away from the grill cover for minimizing the amount of heat that is transferred from the grill cover to the outer casing. In one embodiment, the spacing element or shoulder may be an internally threaded nut 220 that is secured to the bottom wall 225 of the outer casing 224 and that surrounds the temperature sensing probe 202. In one embodiment, the grill cover may have a temperature sensing probe opening for enabling the temperature sensing probe 202 to pass therethrough for obtaining temperature readings inside the grill. In one embodiment, the internally threaded nut 220 may have an outer diameter that closely matches an inner diameter of the temperature sensing probe opening for forming a close fit between the internally threaded nut and the temperature sensing probe opening to stabilize the connection between the digital thermometer 200 and the grill cover.

Figure 20A:
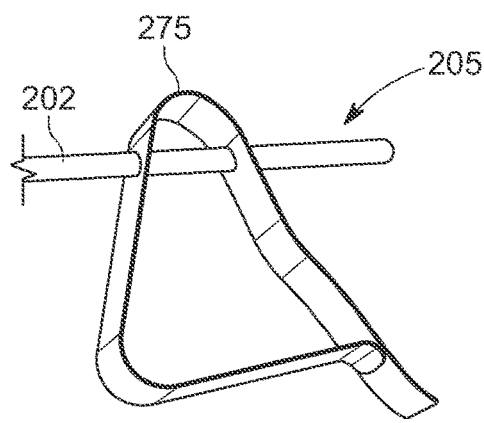
FIG. 20A is a side view of a temperature sensing probe of a digital thermometer and a spring clip coupled with the temperature sensing probe, in accordance with one embodiment of the present patent application.
Figure 20B:
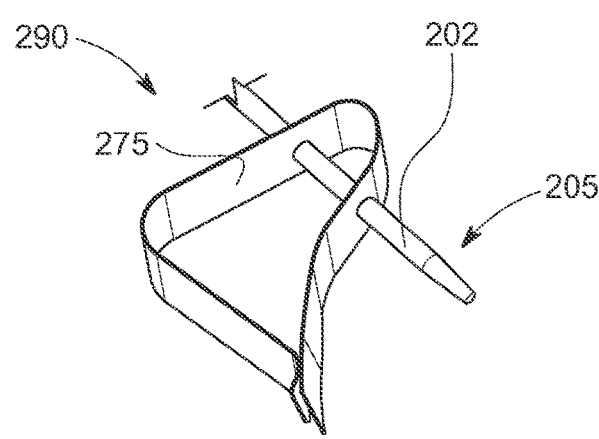
FIG. 20B shows a method of using a spring clip to secure a temperature sensing probe of a digital thermometer to a grill cover, in accordance with one embodiment of the present patent application.

Referring to FIGS. 20A and 20B, in one embodiment, a spring clip 275 may be used for securing the digital thermometer 200 (FIGS. 19A and 19B) to a grill cover 290. In one embodiment, after the free end 205 of the temperature sensing probe 202 is passed through an opening in the grill cover 290, the free end 205 of the temperature sensing probe 202 is located inside the grill. The spring clip 275 may then be slid over the free end 205 of the temperature sensing probe 202 and moved toward the inner surface of the grill cover 290 for securing the digital thermometer 200 (FIGS. 19A and 19B) to the grill cover 290.

In one embodiment, a temperature monitoring system for controlling cooking operations may include one or more food probes that are in electronic communication with a digital thermometer (e.g., the digital thermometers 100 and 200 shown and described herein in FIGS. 1A-20B). In one embodiment, the food probes may be inserted directly into food items (e.g., meat, steaks) for directly monitoring the internal cooking temperatures of the food items being cooked on a grill. The one or more food probes may be directly connected to the digital thermometers disclosed herein via conductive wires and/or may be wirelessly connected with the digital thermometers via wireless communication protocols (e.g., Blue Tooth technology). As a result, the temperature readings obtained by the foods probes are transmitted to the digital thermometers, which, in turn, may be transmitted to remote devices (e.g., remote receivers, smart phones, mobile devices, tablets).

In one embodiment, a temperature monitoring system may include a dedicated receiver that is in communication with a digital thermometer and/or one or more foods probes so that cooking operations may be monitored remotely. The dedicated receiver may be a remote unit that is carried by an operator away from the grill, but which maintains constant communication with the digital thermometer and the one or more food probes via wireless signals such as 433/915 MHz frequency signals or 2.4 GHz frequency signals. In one embodiment, the system may include a software application that is utilized with a smart phone and/or a mobile device for enabling remote monitoring and/or wireless communication with the digital thermometers and one or more food probes disclosed herein.

In one embodiment, the temperature monitoring systems disclosed herein may incorporate the technology, temperature monitoring methodologies, and communication protocols disclosed in commonly assigned U.S. Pat. No. 8,240,914 to Chapman et al. (e.g., wireless, remote temperature and doneness level monitoring), and U.S. Pat. No. 6,539,842 to Chapman et al. (e.g., wireless temperature and doneness level monitoring using a wireless rotisserie unit), the discloses of which are hereby incorporated by reference herein.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A digital thermometer for use with a cooking grill comprising:
    an outer casing having a bottom wall that defines a closed lower end of said outer casing and a side wall that projects upwardly from said bottom wall to define an open upper end of said outer casing;
    a housing for electronic components disposed inside said outer casing and being surrounded by said side wall of said outer casing;
    a printed circuit board disposed inside said housing;
    a microprocessor and a visual display component mounted on said printed circuit board;
    an insulating assembly disposed inside said outer casing and being located between said bottom wall of said outer casing and said housing;
    a temperature sensing probe projecting from said bottom wall of said outer casing for obtaining temperature readings and transmitting the temperature readings to said microprocessor mounted on said printed circuit board;
    wherein said side wall of said outer casing is spaced from an outer perimeter of said housing to define a heat vent that extends between said outer casing and said housing for dissipating heat from said digital thermometer.

2. The digital thermometer as claimed in claim 1, wherein said outer casing comprises a thermally conductive material.

3. The digital thermometer as claimed in claim 2, wherein said thermally conductive material of said outer casing comprises stainless steel.

4. The digital thermometer as claimed in claim 1, wherein said bottom wall of said outer casing has an opening extending therethrough, and wherein said temperature sensing probe passes through the opening of said bottom wall.

5. The digital thermometer as claimed in claim 4, further comprising an outer casing screw that is coupled with said outer casing and that projects from said bottom wall of said outer casing, wherein said outer casing screw has a screw head that overlies a top surface of said bottom wall of said outer casing, an elongated shaft having external threads that is aligned with the opening of said bottom wall of said outer casing and that projects from said bottom wall of said outer casing, and an elongated conduit that extends along a length of said elongated shaft.

6. The digital thermometer as claimed in claim 5, wherein said temperature sensing probe passes through said elongated conduit of said outer casing screw, and wherein said temperature sensing probe has a lower end that projects below a lower end of said outer casing screw.

7. The digital thermometer as claimed in claim 6, further comprising an internally threaded nut that is threaded onto the external threads of said outer casing screw for securing said outer casing screw to said outer casing, wherein said bottom wall of said outer casing is located between said screw head of said outer casing screw and said internally threaded nut.

8. The digital thermometer as claimed in claim 1, wherein said insulating assembly comprises:
    a bottom insulating layer having an outer rim that extends around an outer perimeter thereof;
    a top insulating layer assembled with and overlying a top surface of said bottom insulting layer, wherein a bottom surface of said top insulating layer is spaced away from the top surface of said bottom insulating layer to define a double-walled structure having an insulating air gap between said top and bottom insulating layers.

9. The digital thermometer as claimed in claim 8, wherein said outer rim of said bottom insulating layer includes a convexly curved surface, and wherein an inner surface of said side wall of said outer casing includes a concave surface that seats the convexly curved surface of said outer rim of said bottom insulating layer.

10. The digital thermometer as claimed in claim 8, wherein said insulating assembly comprises a plastic that exhibits high resistance to heat.

11. The digital thermometer as claimed in claim 10, wherein the plastic that exhibits high resistance to heat comprises Bakelite material.

12. The digital thermometer as claimed in claim 1, wherein said housing comprises:
    a housing base that is adapted to seat said printed circuit board;
    a housing cover overlying said housing base, wherein said printed circuit board is disposed between said housing cover and said housing base.

13. The digital thermometer as claimed in claim 12, wherein said housing has an outer perimeter that defines an outer diameter of said housing, wherein said side wall of said outer casing has an inner surface that defines an inner diameter of said outer casing, and wherein the inner diameter of said outer casing is greater than the outer diameter of said housing to define the heat vent that extends between said housing and said outer casing.

14. The digital thermometer as claimed in claim 1, further comprising a wire disposed inside said temperature sensing probe that is adapted to obtain temperature data from a temperature sensor located at a lower end of said temperature sensing probe and transmit the temperature data to said microprocessor mounted on said printed circuit board.

15. The digital thermometer as claimed in claim 14, wherein said wire has an upper end that passes through said bottom wall of said outer casing, said insulating assembly, and said housing for being in electronic communication with said microprocessor mounted on said printed circuit board.

16. The digital thermometer as claimed in claim 1, wherein said visual display component comprises a liquid crystal display.

17. A digital thermometer for cooking comprising:
    a bowl-shaped outer casing made of a thermally conductive metal having a bottom wall that defines a closed lower end of said bowl-shaped outer casing and a side wall that projects upwardly from said bottom wall to define an open upper end of said bowl-shaped outer casing;
    a housing for electronic components being disposed inside said bowl-shaped outer casing and being surrounded by said side wall of said bowl-shaped outer casing;
    a printed circuit board disposed inside said housing;
    a microprocessor and a visual display component mounted on said printed circuit board;

an insulating assembly disposed inside said bowl-shaped outer casing and being located between said bottom wall of said bowl-shaped outer casing and said housing;

a temperature sensing probe projecting from said bottom wall of said bowl-shaped outer casing for obtaining temperature readings and transmitting the temperature readings to said microprocessor mounted on said printed circuit board;

wherein said side wall of said bowl-shaped outer casing is spaced from said housing for defining a heat vent that extends between said outer casing and said housing for dissipating heat from said digital thermometer, and wherein said insulating assembly deflects heat away from said printed circuit board and said microprocessor and said visual display component mounted on said printed circuit board.

18. The digital thermometer as claimed in claim 17, wherein said housing has an outer perimeter that defines an outer diameter of said housing, wherein said side wall of said outer casing has an inner surface that defines an inner diameter of said outer casing, and wherein the inner diameter of said outer casing is greater than the outer diameter of said housing to define the heat vent that extends between said housing and said outer casing.

19. The digital thermometer as claimed in claim 18, further comprising a temperature sensor and a wire disposed inside said temperature sensing probe that is adapted to obtain temperature data from said temperature sensor at a lower end of said temperature sensing probe and transmit the temperature data to said microprocessor mounted on said printed circuit board.

20. The digital thermometer as claimed in claim 19, wherein said wire has an upper end that passes through said bottom wall of said outer casing, said insulating assembly, and said housing for being in electronic communication with said microprocessor mounted on said printed circuit board.

* * * * *